(12) United States Patent
Yamanaka et al.

(10) Patent No.: US 6,922,288 B2
(45) Date of Patent: Jul. 26, 2005

(54) LASER MULTIPLEXING APPARATUS

(75) Inventors: Fusao Yamanaka, Kaisei-machi (JP);
Yoji Okazaki, Kaisei-machi (JP);
Chiaki Goto, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/767,457

(22) Filed: Jan. 30, 2004

(65) Prior Publication Data

US 2004/0252388 A1 Dec. 16, 2004

(30) Foreign Application Priority Data

Jan. 30, 2003 (JP) .......................................... 2003-022056
Jan. 7, 2004 (JP) .......................................... 2004-002238

(51) Int. Cl.$^7$ .......................... G02B 27/10; G02B 5/04; F21K 0/00
(52) U.S. Cl. .......................... 359/618; 359/834; 362/259
(58) Field of Search ................................. 359/618–621, 359/625, 641, 583, 196, 831–834, 494, 495; 385/27, 33, 36, 39, 49; 372/6; 362/31, 259, 551, 553

(56) References Cited

U.S. PATENT DOCUMENTS

| | | |
|---|---|---|
| 5,513,201 A | 4/1996 | Yamaguchi et al. |
| 5,808,323 A | 9/1998 | Spaeth et al. |
| 6,028,722 A | 2/2000 | Lang |
| 6,377,410 B1 * | 4/2002 | Wang et al. .................. 385/33 |
| 6,407,870 B1 * | 6/2002 | Hurevich et al. ........... 359/642 |
| 2002/0090172 A1 | 7/2002 | Okazaki et al. |

* cited by examiner

*Primary Examiner*—Georgia Epps
*Assistant Examiner*—Alicia M. Harrington
(74) *Attorney, Agent, or Firm*—Sughrue Mion, PLLC

(57) ABSTRACT

In a laser light multiplexing apparatus: a collimating optical system collimates light beams emitted from semiconductor lasers so that the slow axes of the light beams become coplanar, and optical axes of the light beams become parallel to each other; a light beam rearrangement optical system constituted by prisms respectively arranged in correspondence with the light beams rearranges the light beams in such a manner that directions of the fast axes of the light beams are changed at different locations along a direction in which the light beams propagate, and the fast axes of the light beams become coplanar; and a convergence optical system converges a bundle of the light beams rearranged by the light beam rearrangement optical system, in directions of the fast axes and the slow axes of the light beams, and makes the converged bundle of the light beams enter an optical fiber.

7 Claims, 27 Drawing Sheets

◎ INDICATE OPTICAL PATHS PERPENDICULAR TO THE DRAWING SHEET
FIG. 5A
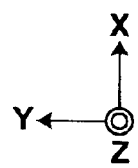
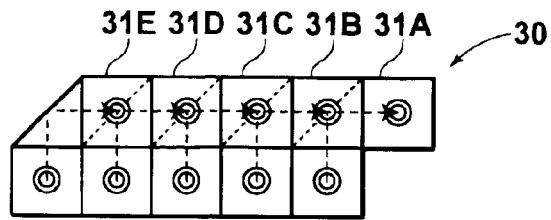
FIG. 5B
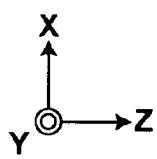
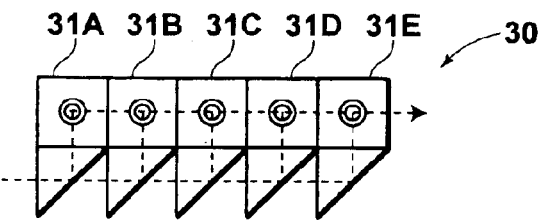
FIG. 5C
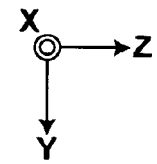
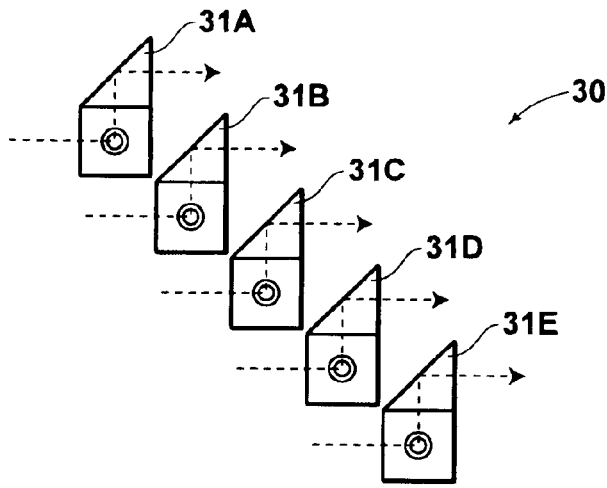

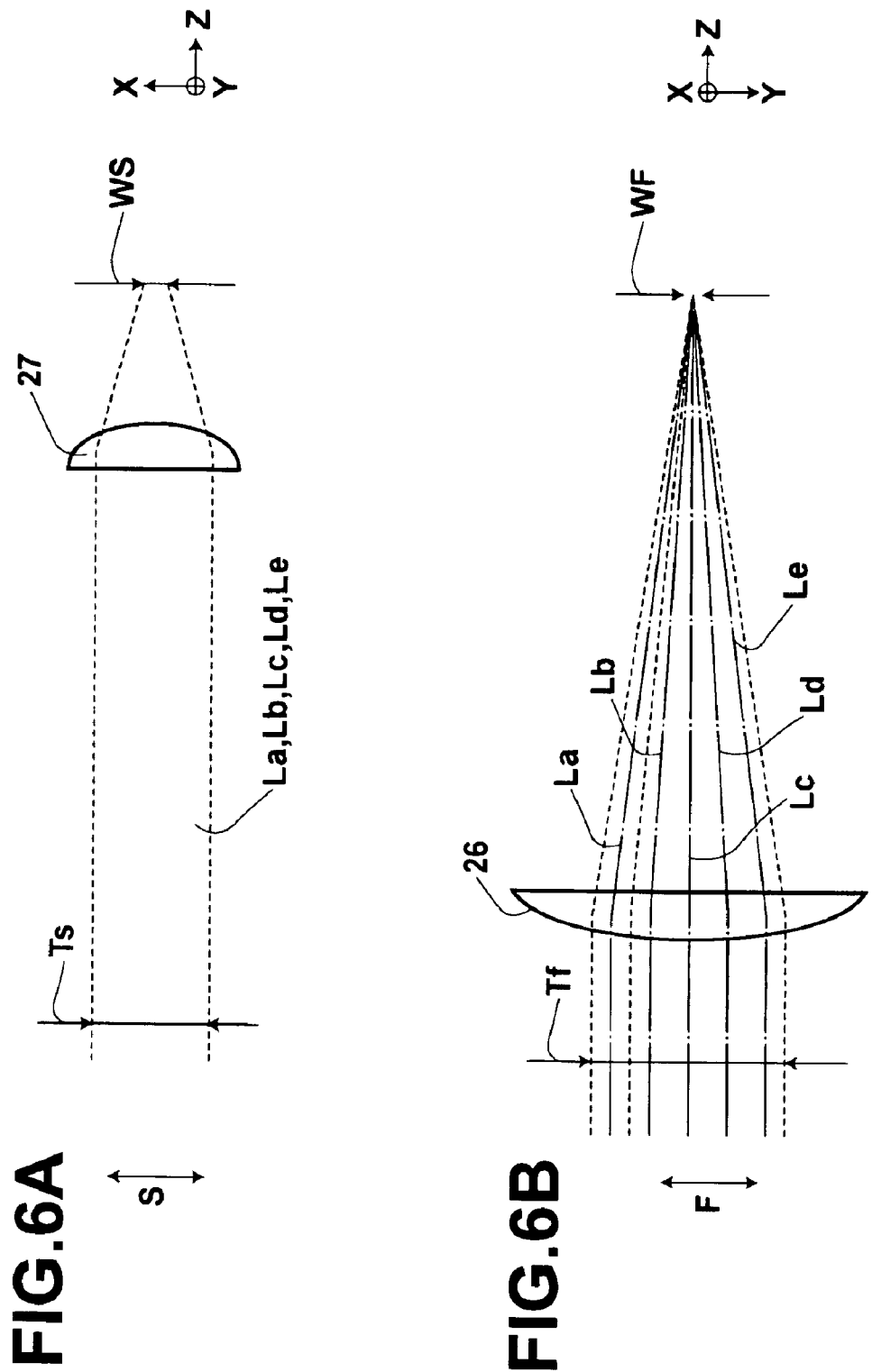

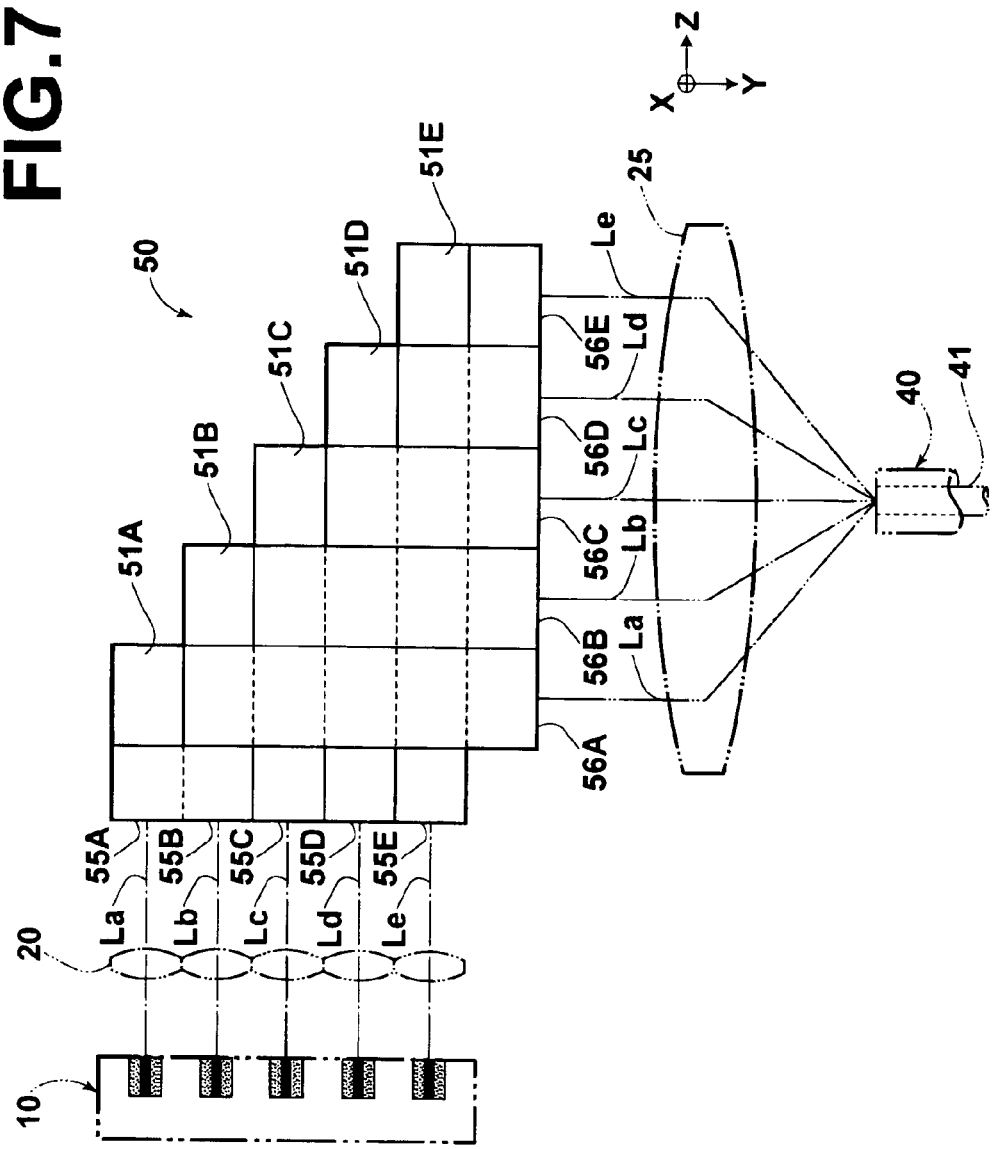

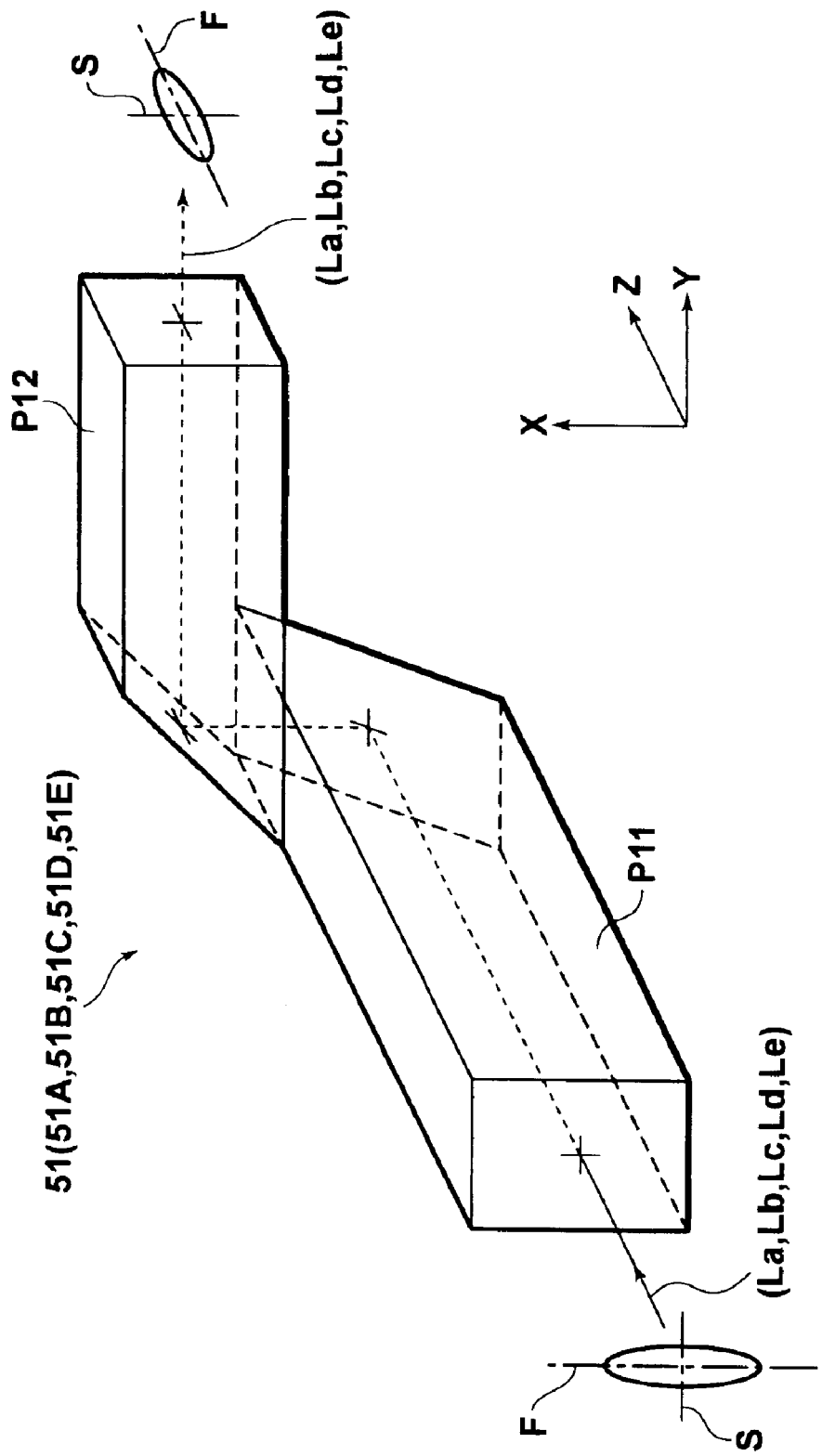

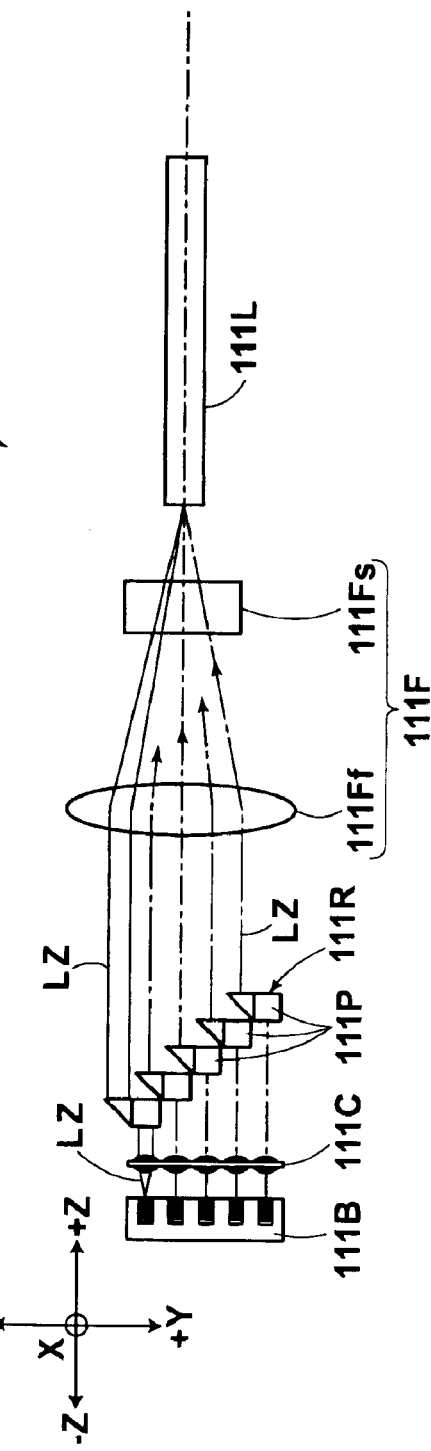
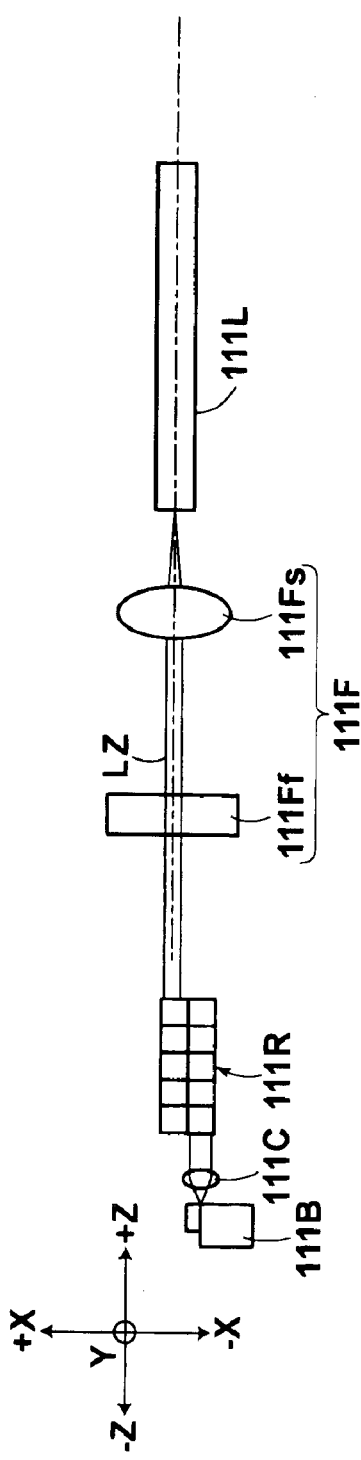
FIG.10A
FIG.10B

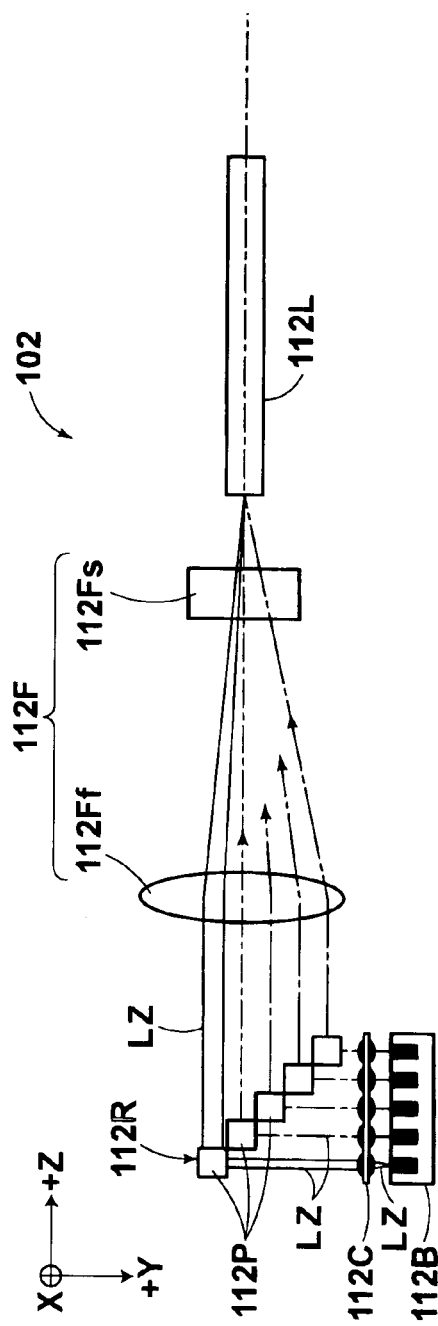
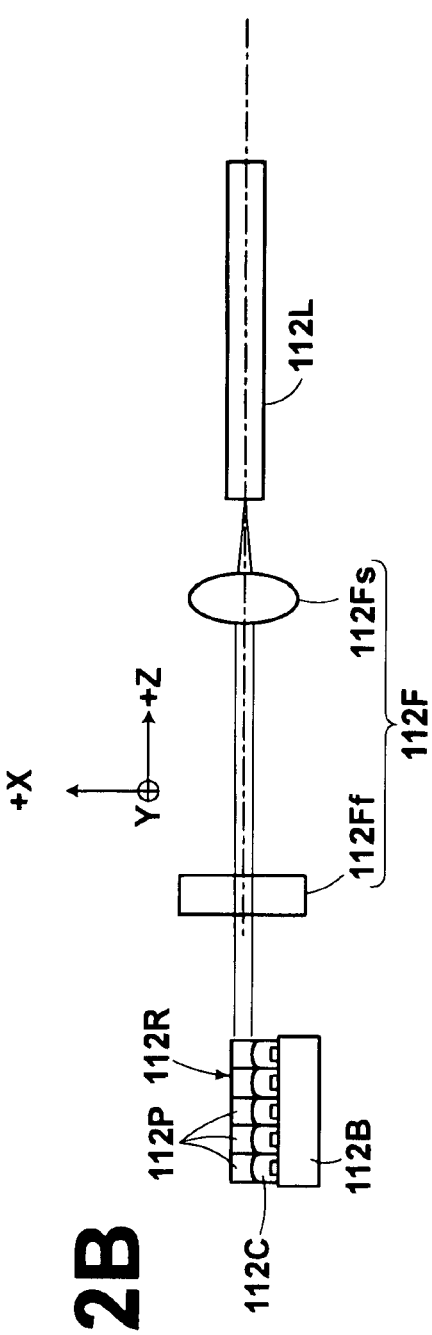
FIG.12A
FIG.12B

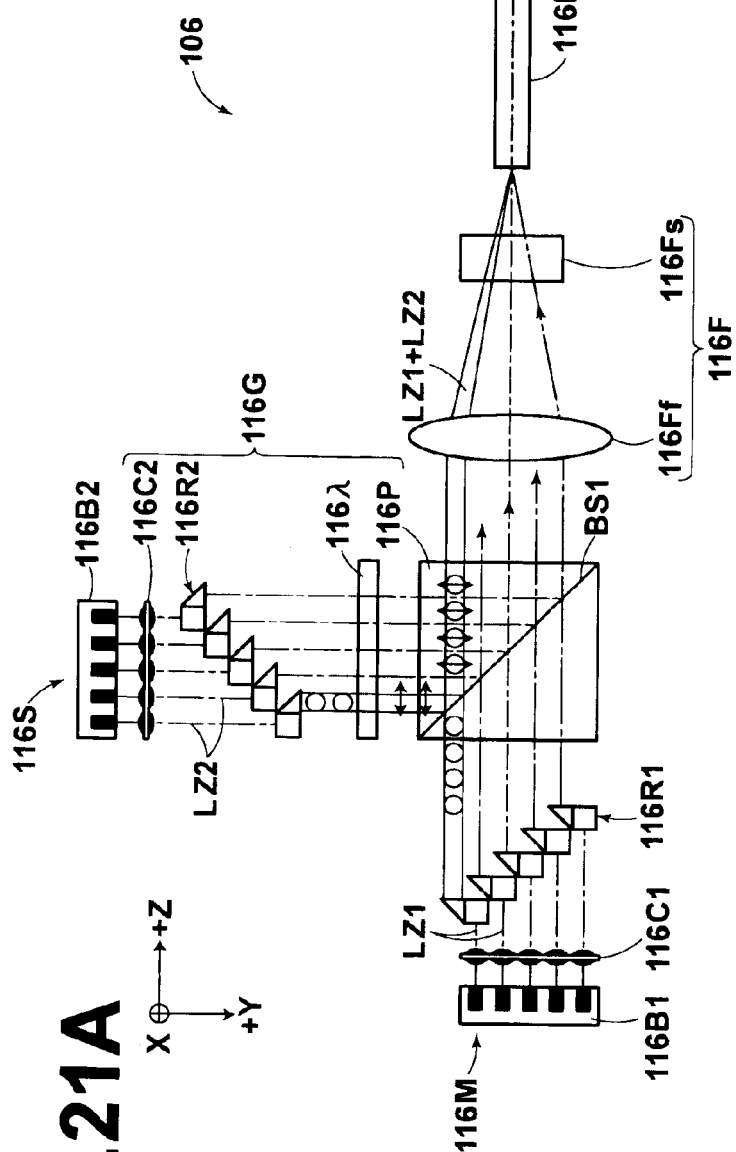
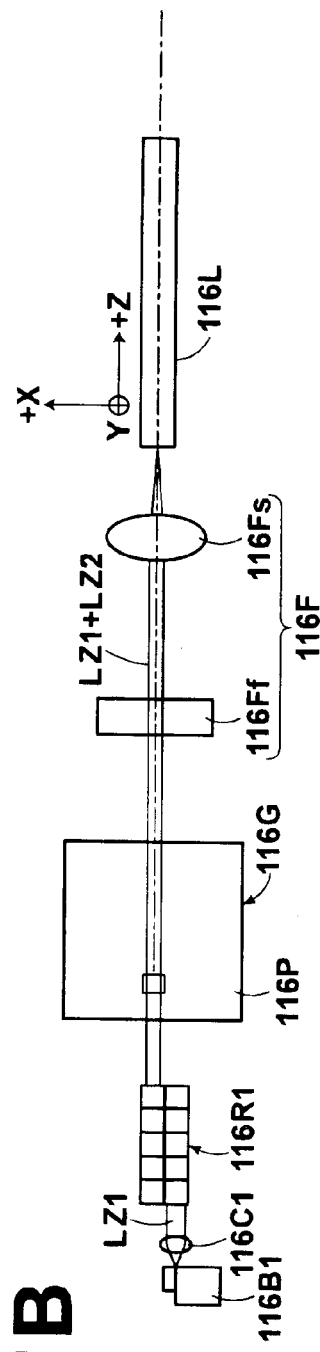
FIG. 21A
FIG. 21B

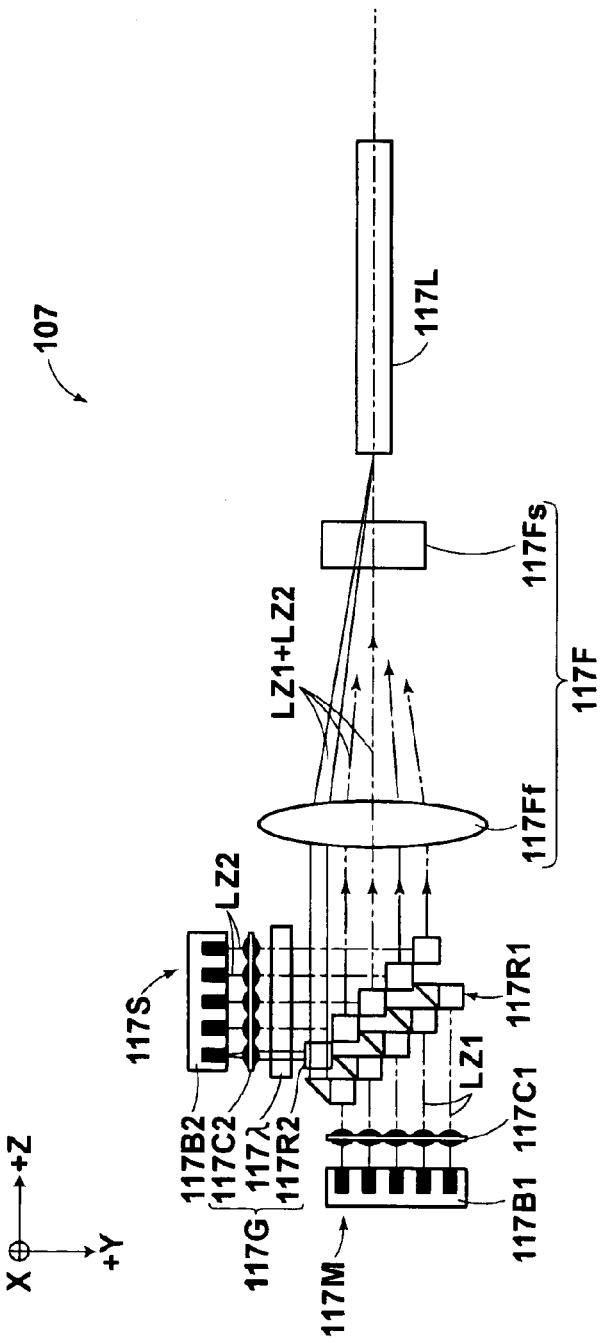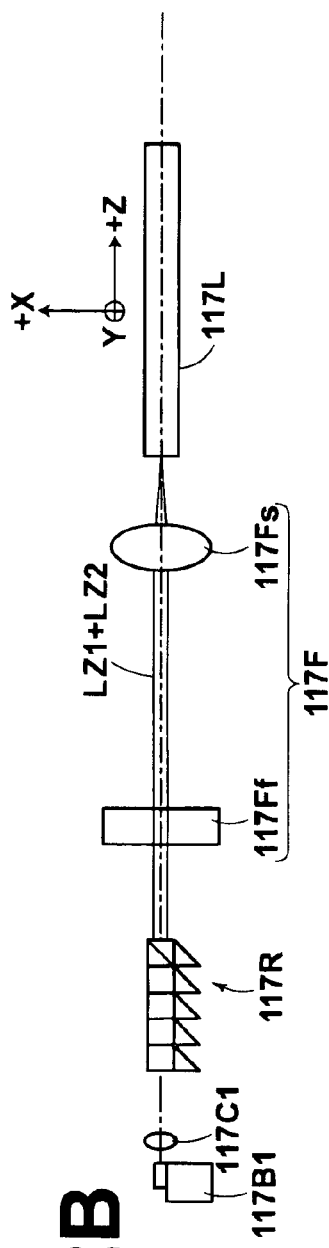
FIG.22A
FIG.22B

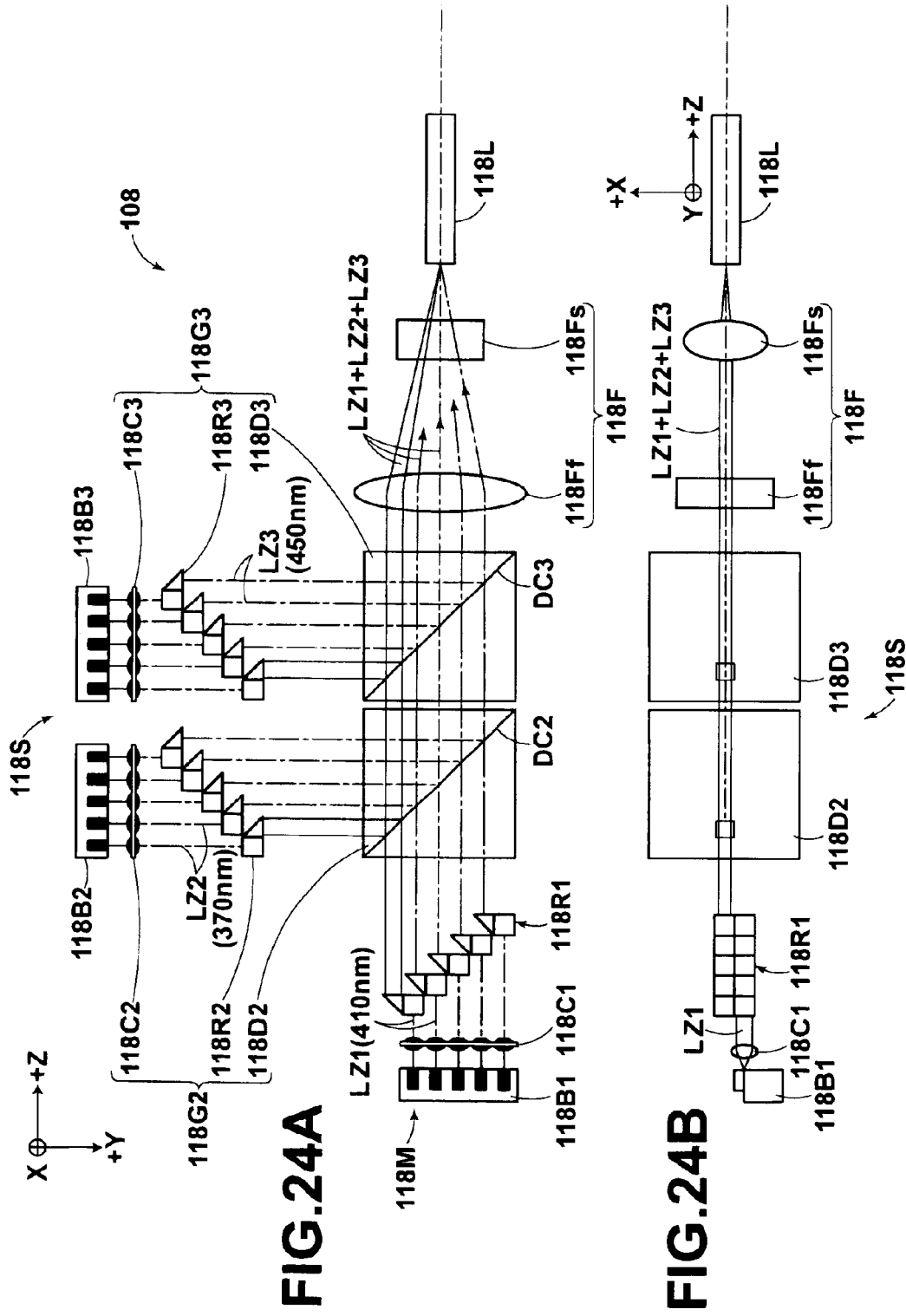

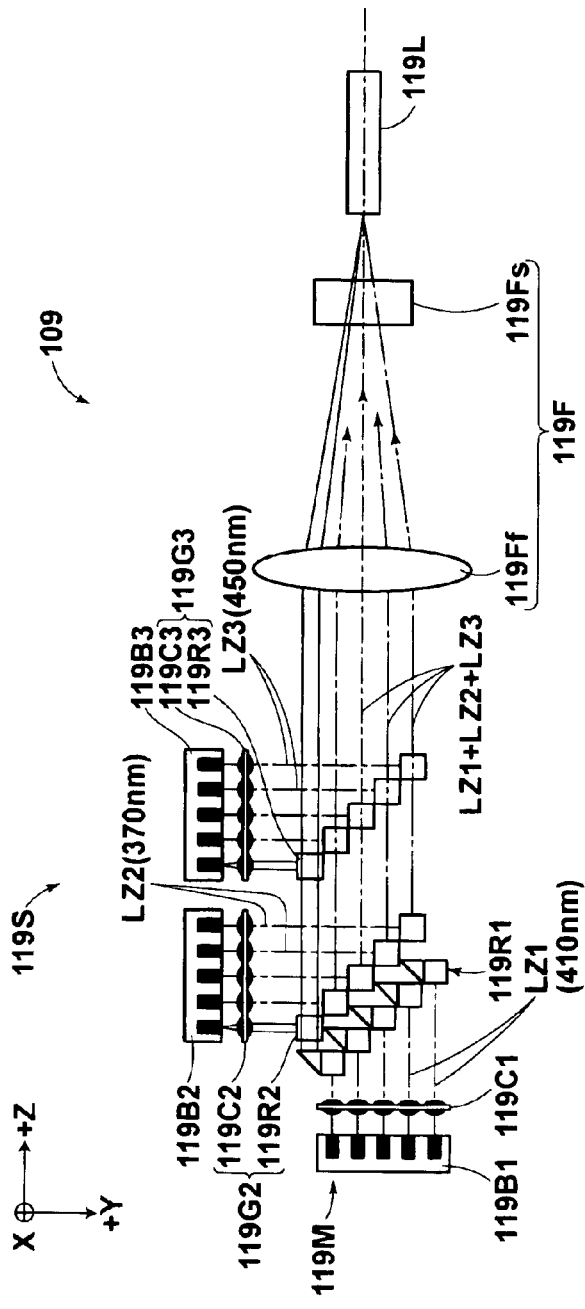
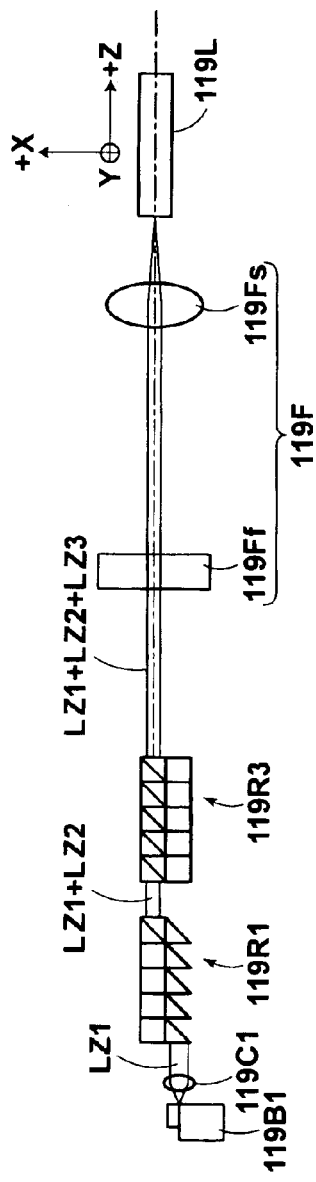
FIG.25A
FIG.25B

Ex 1,2,6,7,8,9

Ex 3

Ex 4

Ex 5

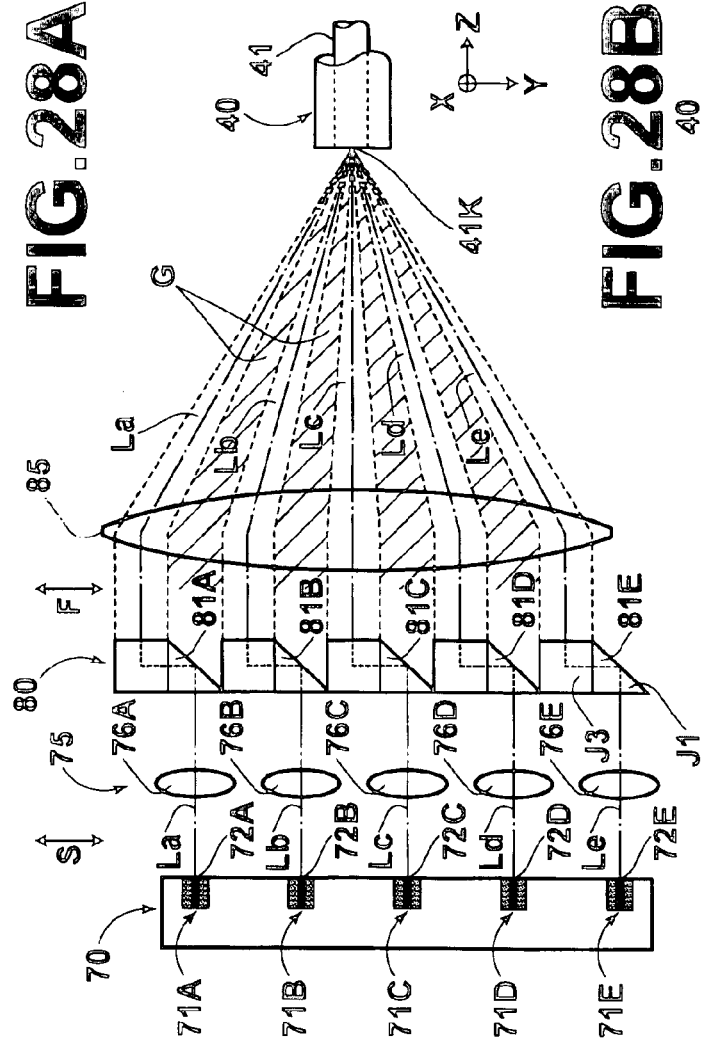
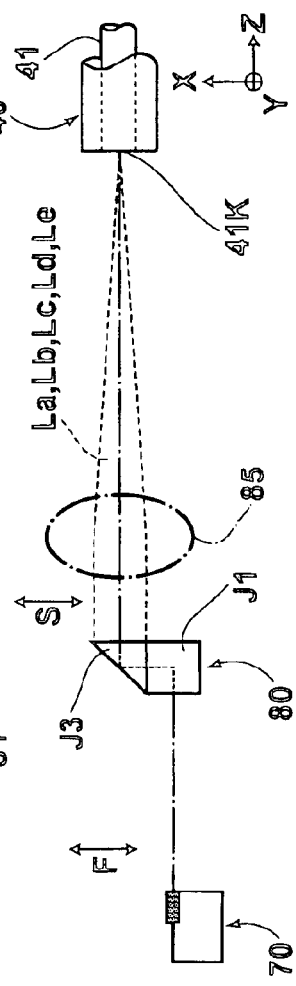
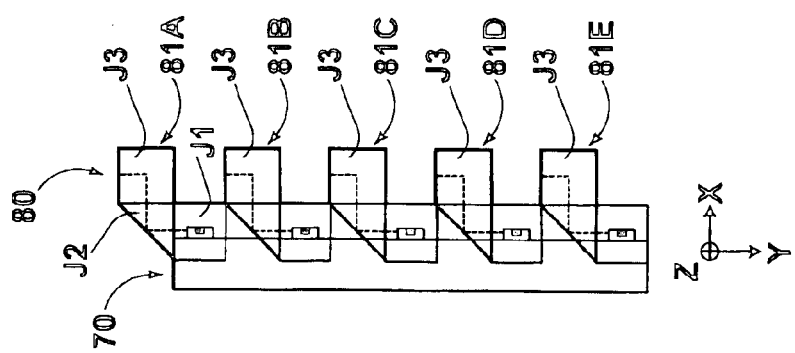
FIG. 28A
FIG. 28B
FIG. 28C

LASER MULTIPLEXING APPARATUS

BACKGROUND OF THE INVENTION

1. Field of the Invention

The present invention relates to a laser light multiplexing apparatus that causes an entire bundle of light beams emitted from a plurality of semiconductor lasers to converge and enter an optical fiber.

2. Description of the Related Art

U.S. Patent Laid-Open No. 20020090172 discloses a method of propagating laser light within an optical fiber. In this method, laser light beams emitted from a plurality of semiconductor lasers arranged in a single direction are collimated through collimator lenses so as to obtain collimated light beams. The optical axes of the collimated light beams are parallel to each other and aligned along a single direction. All of the collimated light beams are collected and are individually condensed so that the collected and condensed light beams enter a single optical fiber. Thereby, laser light propagates through the optical fiber with high energy density.

It is known that the entirety of a plurality of light beams, the optical axes of which are aligned along a single direction, can be converged into a small cross section when the fast axes of the light beams are aligned along a single direction. That is, light beams emitted from each semiconductor laser have fast axes in the thickness direction of the active layer of the semiconductor laser. The light beams also have slow axes in a direction perpendicular to the thickness direction and parallel to the surface of the active layer of the semiconductor laser. The above light beams have satisfactory wavefronts in the directions of the fast axes and can be accurately converged. However, satisfactory wavefronts are not formed in the directions of the slow axes. Therefore, it is not possible to accurately converge the above light beams in the directions of the slow axes.

In another known method for generating a plurality of laser beams, a plurality of semiconductor lasers are arranged on a single substrate. In this case, the surfaces of the active layers of the semiconductor lasers are formed parallel to the surface of the substrate. Therefore, the slow axes of the light beams emitted from the plurality of semiconductor lasers arranged on the single substrate are coplanar. Therefore, in order to optically multiplex a plurality of light beams into a single optical fiber with high coupling efficiency by using the above substrate, it is necessary to realign the above light beams so that the fast axes of the light beams are aligned in a plane, before the entirety of light beams are converged. U.S. Pat. Nos. 5,513,201, 5,808,323, and 6,028,722 propose methods for rearranging the above light beams in the fast and slow axes. Hereinafter, the rearrangement of light beams in the fast and slow axes will be referred to as light beam rearrangement. Note that the aforementioned coupling efficiency is light utilization efficiency during optically multiplexing of light beams.

In the technique disclosed in U.S. Pat. No. 5,513,201, the above light beam rearrangement is realized by providing prisms in correspondence with each of the light beams and arranged along a direction perpendicular to the propagation direction of the light beams. In this case, it is necessary to spread the intervals between the light beams, to match the arrangement of the prisms. This is because it is difficult to cause the light beams to enter the prisms in a state in which the intervals therebetween are small. Therefore, the size of an apparatus, including a substrate on which semiconductor lasers having wide intervals therebetween, is increased. In addition, there is a problem that spatial utilization efficiency (to be described later) is decreased, leading to a deterioration of the aforementioned coupling efficiency of the light beams and an optical fiber.

If laser light is to be efficiently utilized, it is common practice to administer highly reflective coatings on reflecting surfaces for reflecting the laser light. It is difficult to administer highly reflective coatings on the great number of complexly shaped reflecting surfaces disclosed in U.S. Pat. No. 5,808,323. Similarly, it is difficult to administer highly reflective coatings on the complexly shaped prisms disclosed in U.S. Pat. Nos. 5,513,201 and 6,028,722. However, the amount of loss of the laser light is high along the propagating optical path thereof where the highly reflective coating is not administered, which leads to deterioration of the utilization efficiency. In the case that light beams are reflected a great number of times (five times or greater) within a prism as disclosed in U.S. Pat. No. 6,028,722, the amount of loss of the laser light is particularly high.

Hereinbelow, the space utilization efficiency will be explained in detail with reference to FIGS. 28A, 28B, 28C, 29A, 29B, and 30. FIGS. 28A, 28B, and 28C show a schematic construction of a conventional laser light multiplexing apparatus. FIG. 28A is a plan view, FIG. 28B is a side view from the direction along which semiconductor lasers are arranged, and FIG. 28C is a view from the direction of the optical axes of light beams. A collimating optical system, which is arranged between the semiconductor lasers and the light beam rearrangement optical system, is omitted from FIG. 28C. FIGS. 29A and 29B are provided to illustrate rearrangement of the light beams and optical multiplexing in the laser light multiplexing apparatus. FIG. 29A shows a light beam rearrangement optical system rearranging the directions of axes of the light beams, and FIG. 29B shows optical multiplexing of the light beams in an optical fiber. FIG. 30 is a perspective view illustrating arrangement of prisms constituting the light beam rearrangement optical system.

The laser light multiplexing apparatus illustrated in FIGS. 28A, 28B, and 28C includes a laser block 70, the collimating optical system 75, the light beam rearrangement optical system 80, and a convergence optical system 85. Five semiconductor lasers 71A, 71B, 71C, ... are provided on the laser block 70 in such a manner that active layers 72A, 72B, 72C, ... of the semiconductor lasers 71A, 71B, 1C, ... are coplanar and are aligned along the Y direction indicated in FIGS. 28A, 28B, and 28C. The collimating optical system 75 collimate light beams La, Lb, Lc, ... which are emitted from the semiconductor lasers 71A, 71B, 71C, ... in the Z direction indicated in FIGS. 28A, 28B. The collimated light beams La, Lb, Lc, ... are parallel to each other, and have coplanar slow axes. The light beam rearrangement optical system 80 is constituted by five prisms 81A, 81B, 81C, ... arranged along a direction perpendicular to the propagation direction of the light beams La, Lb, Lc, ... in correspondence with the light beams. The light beam rearrangement optical system 80 rearranges the light beams collimated by the collimating optical system 75. The convergence optical system 85 converges the entire bundle of the light beams rearranged by the light beam rearrangement optical system 80, in the directions of the slow and fast axes.

The collimating optical system 75 is constituted by collimator lenses 76A, 76B, 76C, ....

The light beam rearrangement optical system 80 changes the directions of the fast axes of the light beams La, Lb, Lc, . . . collimated by the collimating optical system 75, from the X directions to the Y directions so that the fast axes of the light beams are coplanar.

That is, in the laser light multiplexing apparatus illustrated in FIGS. 28A, 28B, and 28C, the light beams La, Lb, Lc, . . . emitted from the semiconductor lasers 71A, 71B, 71C, . . . are collimated by the collimating optical system 75 into collimated light beams with parallel optical axes and coplanar slow axes. Then, the collimated light beams La, Lb, Lc, . . . pass through the prisms 81A, 81B, 81C, . . . , and rearranged so that the fast axes of the collimated light beams La, Lb, Lc, . . . are oriented in the Y direction and are coplanar (as illustrated in FIG. 29A). The entire bundle of the light beams rearranged as above are converged so that the widths of the entire bundle, in the directions of the fast and slow axes (F and S, respectively), are reduced, and enters a core 41 of an optical fiber 40 (as illustrated in FIG. 29B).

Light beams are converged with higher quality in the directions of the fast axes than in the directions of the slow axes. Therefore, the rearranged light beams having the coplanar fast axes can be coupled to the core 41 of the optical fiber 40 with high coupling efficiency.

In the case where each of the prisms 81A, 81B, 81C, . . . is formed by combining prism portions J1, J2, and J3 each having a shape of a triangular prism as illustrated in FIG. 30, each of the light beams enters the prism portion J1 in one of the prisms 81A, 81B, 81C, . . . corresponding to the light beam, and is reflected in the prism portion J1 so as to be redirected to the Y direction. Subsequently, the light beam reflected in the prism portion J1 is further reflected and redirected in the prism portions J2 and J3, and is thereafter output from the prism portion J3. However, as illustrated in FIG. 30, it is necessary to provide spacing between adjacent prism portions J3 for placing the prism portions J1. That is, it is impossible to arrange the adjacent prism portions J3 close to each other. Therefore, there are substantial gaps G between the light beams La, Lb, Lc, . . . converged by the convergence optical system 85 as illustrated in FIG. 28A.

When the focal length and the numerical aperture of each of the collimator lenses 76A, 76B, 76C, . . . are indicated by $f_1$ and $NA_1$, the focal length of the convergence optical system 85 is indicated by $f_2$, the numerical aperture of the optical fiber 40 indicated by $NA_2$, and the space utilization efficiency indicated by $\eta$, the magnification power M of the lens system, i.e., the ratio of the dimension of the light emission spot (the active layer of each of the semiconductor lasers 71A, 71B, 71C, . . . ) to the dimension of the convergent spot which each of the light beams La, Lb, Lc, . . . forms on an end face of the core 41 of the optical fiber 40, is expressed by the following equation (1).

$$M = \frac{f_2}{f_1} = \frac{NA_1}{\left(\frac{NA_2}{N} \times \eta\right)} = \frac{NA_1}{NA_2} \times \frac{N}{\eta} \tag{1}$$

Note that N denotes the number of the light beams to be optically multiplexed. In addition, the space utilization efficiency $\eta$ is defined as a ratio of the sum of the spaces occupied by the respective light beams La, Lb, Lc, . . . to the continuous space containing the entire bundle of the light beams La, Lb, Lc, . . . (i.e., the space between and including the light beams La and Le) . Therefore, when the optical paths of the seven laser beams La through Le are adjacent each other, $\eta=1$.

As clearly shown by equation (1), the magnification power M decreases with an increase in the space utilization efficiency $\eta$. In addition, the displacement of each of the light beams La, Lb, Lc, . . . on the end face of the core 41 of the optical fiber 40 caused by misalignment between the relative positions of the semiconductor lasers 71A, 71B, 71C, . . . , the convergence optical system 85, and the optical fiber 40 decreases with a decrease of the magnification power M. Therefore, the accuracy in the optical multiplexing of the light beams increases as the magnification power M decreases.

When there are substantial gaps between the light beams rearranged by the light beam rearrangement optical system, the space utilization efficiency $\eta$ is small. Therefore, in this case, it is difficult to accurately perform the optical multiplexing of the light beams after the entire bundle of the light beams is converged, and thus the coupling efficiency of the light beams to the optical fiber decreases.

SUMMARY OF THE INVENTION

The present invention has been developed in view of the above circumstances.

It is an object of the present invention to provide a laser light multiplexing apparatus which suppresses increase in the device size, and can optically multiplex an entirety of a bundle of light beams with high coupling efficiency.

A method for optically multiplexing laser light of the present invention comprises the steps of:

emitting, from a plurality of semiconductor lasers, light beams having parallel optical axes, coplanar slow axes, and fast axes;

changing the directions of the fast axes of the light beams at different positions along the direction in which the light beams propagate, so that the fast axes of the light beams become coplanar; and converging a bundle of the light beams having the coplanar fast axes in the directions of the fast axes and the slow axes of the light beams, and making the converged bundle of the light beams enter an optical fiber.

A laser light multiplexing apparatus of the present invention comprises:

a laser block on which a plurality of semiconductor lasers each having active layers, which are coplanar with respect to each other, are arranged;

a collimating optical system which collimates the light beams in such a manner that slow axes of the light beams are coplanar, and the optical axes of the light beams are parallel to each other;

a light beam rearrangement optical system, which includes a plurality of prisms respectively arranged corresponding to each of said light beams, for rearranging the light beams in such a manner that directions of the fast axes of the light beams are changed at different locations along the direction in which the light beams propagate, and the fast axes of the light beams become coplanar; and a convergence optical system which converges a bundle of the light beams rearranged by the light beam rearrangement optical system, in directions of the fast axes and the slow axes of the light beams, and makes the converged bundle of the light beams enter an optical fiber.

A construction may be adopted wherein the collimating optical system comprises truncated lenses.

Note that truncated lenses refer to lenses of which the dimensions have been shortened in a direction that intersects with the optical axes thereof. That is, in the case that the lenses are aligned in a row, the dimensions thereof are shortened in the direction of alignment. This shortening enables the provision of a greater number of lenses within a predetermined space.

The laser light multiplexing apparatus of the present invention may further comprise:

additional semiconductor lasers which emit additional light beams; and a polarization multiplex means which performs polarization multiplexing of said additional light beams and said light beams in optical paths of the light beams between said plurality of semiconductor lasers and said optical fiber so that said additional light beams also enter said optical fiber.

Alternatively, the laser multiplexing apparatus of the present invention may further comprise:

additional semiconductor lasers which emit additional light beams; and is a wavelength multiplex means which performs wavelength multiplexing of said additional light beams and said light beams in optical paths of the light beams between said plurality of semiconductor lasers and said optical fiber so that said additional light beams also enter said optical fiber.

Note that the phrase "parallel optical axes" is not limited to cases in which the optical axes are completely parallel. Cases in which the optical axes are essentially parallel are also included. The phrase "light beams . . . are parallel" also includes cases in which the light beams are essentially parallel. In addition, the term "coplanar" is not limited to cases in which the axes of the light beams are completely coplanar. Cases in which the axes of the light beams are essentially coplanar are also included.

It is not necessary that the collimating optical system, the light beam rearrangement optical system, and the convergence optical system are formed separately. It is possible that one of the above three optical systems also serves to function as another of the optical systems. For example, the light beam rearrangement optical system may serve part of the function of bringing the light beams closer to each other in the direction of the fast axes. Alternatively, the collimating optical system may serve part of the function of the convergence optical system, by bringing the light beams closer to each other in the direction of the slow axes.

The laser light multiplexing method of the present invention emits, from a plurality of semiconductor lasers, light beams having parallel optical axes, coplanar slow axes, and fast axes;

changes the directions of the fast axes of the light beams at different positions along the direction in which the light beams propagate, so that the fast axes of the light beams become coplanar; and converges a bundle of the light beams having the coplanar fast axes in the directions of the fast axes and the slow axes of the light beams, and making the converged bundle of the light beams enter an optical fiber. Therefore, it is possible to prevent interference in space necessary for change in the directions of the fast axes of the light beams, even when the light beams are close to each other. Accordingly, the light beams can be arranged close to each other. Thus, it is possible to make the entire bundle of the light beams enter the optical fiber with high coupling efficiency without lowering the utilization efficiency of the laser light, which is caused by increase in the gaps between the light beams. In addition, increase in the device size can be suppressed.

The laser light multiplexing apparatus of the present invention comprises:

a laser block on which a plurality of semiconductor lasers each having active layers, which are coplanar with respect to each other, are arranged;

a collimating optical system which collimates the light beams in such a manner that slow axes of the light beams are coplanar, and the optical axes of the light beams are parallel to each other;

a light beam rearrangement optical system, which includes a plurality of prisms respectively arranged corresponding to each of said light beams, for rearranging the light beams in such a manner that directions of the fast axes of the light beams are changed at different locations along the direction in which the light beams propagate, and the fast axes of the light beams become coplanar; and a convergence optical system which converges a bundle of the light beams rearranged by the light beam rearrangement optical system, in directions of the fast axes and the slow axes of the light beams, and makes the converged bundle of the light beams enter an optical fiber. Therefore, it is possible to suppress increase in the device size, and optically multiplex an entire bundle of light beams with high space utilization efficiency and coupling efficiency.

That is, the light beam rearrangement optical system is constituted by a plurality of prisms respectively arranged in correspondence with the light beams. Each of the prisms can be formed by combining prism portions each having a shape of a triangular prism. Therefore, it is easy apply a high reflection coating to reflection surfaces in the light beam rearrangement optical system. In addition, since the number of reflections within the prisms can be reduced (for example, to three times or less), it is possible to reduce optical loss in optical paths through which the light beams pass. Further, since the collimated light beams, which are parallel to each other, are rearranged at different locations along the direction of the light beams, it is possible to arrange the light beams close to each other on both of the input and output sides of the prisms constituting the light beam rearrangement optical system, and prevent increase in the device size. Furthermore, since the light beams entering the prisms are close to each other, the space utilization efficiency η is increased. Therefore the magnification power M in the equation (1) is decreased. Thus, it is possible to optically multiplex the entire bundle of the light beams with high efficiency in utilization and coupling of laser light.

The laser light multiplexing apparatus of the present invention is extremely advantageous when the light beams to be optically multiplexed have wavelengths of 450 nm or smaller. This is because the light beam rearrangement optical system has a construction which is easy to produce by combining elements each having a simple shape. Therefore, forming of high reflection coatings, which exhibit high reflectance in the short wavelength range, on reflection surfaces in the light beam rearrangement optical system is facilitated. Accordingly, the laser light multiplexing apparatus of the present invention exhibits high transmittance, which is an indispensable characteristic for high output power laser devices.

The laser light multiplexing apparatus of the present invention may further comprise additional semiconductor lasers and a polarization multiplex means for polarization multiplexing the light beams emitted by the additional semiconductor lasers. Alternatively, the laser light multiplexing apparatus of the present invention may further comprise additional semiconductor lasers and a wavelength multiplex means for wavelength multiplexing the light beams emitted by the additional semiconductor lasers. In these cases, it is possible to further increase the power of the laser light by increasing the number of light beams entering the optical fiber.

BRIEF DESCRIPTION OF THE DRAWINGS

FIG. 5A is a schematic front view of the light beam rearrangement optical system in the laser light multiplexing apparatus according to the first embodiment, which is viewed from the direction of the optical axes.

FIG. 5B is a schematic side view of the light beam rearrangement optical system in the laser light multiplexing apparatus according to the first embodiment, which is viewed from the direction along which a plurality of semiconductor lasers are arranged.

FIG. 5C is a schematic plan view of the light beam rearrangement optical system in the laser light multiplexing apparatus according to the first embodiment.

FIGS. 6A and 6B are diagrams illustrating convergence of the entire bundle of light beams by the convergence optical system.

FIG. 7 is a schematic plan view of a light beam rearrangement optical system in a laser light multiplexing apparatus according to a second embodiment of the present invention.

FIG. 8 is a perspective view of one of prisms constituting the light beam rearrangement optical system in the laser light multiplexing apparatus according to the second embodiment.

FIGS. 10A and 10B are schematic views illustrating the construction of a laser light multiplexing apparatus according to Embodiment Ex1.

FIGS. 12A and 12B are schematic views illustrating the construction of a laser light multiplexing apparatus according to Embodiment Ex2.

FIGS. 21A and 21B are schematic views illustrating the construction of a laser light multiplexing apparatus according to Embodiment Ex6.

FIGS. 22A and 22B are schematic views illustrating the construction of a laser light multiplexing apparatus according to Embodiment Ex7.

FIGS. 24A and 24B are schematic views illustrating the construction of a laser light multiplexing apparatus according to Embodiment Ex8.

FIGS. 25A and 25B are schematic views illustrating the construction of a laser light multiplexing apparatus according to Embodiment Ex9.

FIG. 28A is a schematic plan view of a conventional laser light multiplexing apparatus.

FIG. 28B is a schematic side view of the conventional laser light multiplexing apparatus from the direction along which semiconductor lasers are arranged.

FIG. 28C is a schematic front view of a portion of the conventional laser light multiplexing apparatus including semiconductor lasers and the light beam rearrangement optical system, which is viewed from the direction of the optical axes of light beams.

DESCRIPTION OF THE PREFERRED EMBODIMENTS

Embodiments of the present invention will be described in detail below, with reference to the attached drawings.

Figure 1:
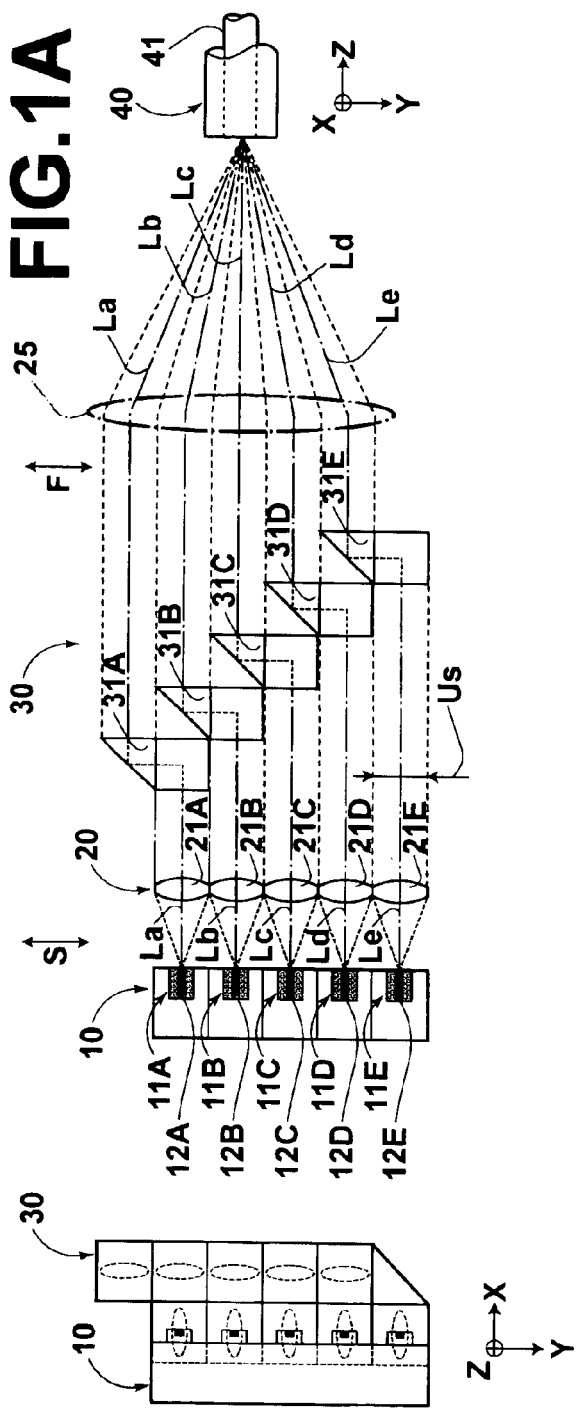
FIG. 1A is a schematic plan view of a laser light multiplexing apparatus according to a first embodiment of the present invention.
FIG. 1B is a schematic side view of the laser light multiplexing apparatus according to the first embodiment, which is viewed from the direction along which a plurality of semiconductor lasers are arranged.
FIG. 1C is a schematic front view of a portion of the laser light multiplexing apparatus according to the first embodiment, which is viewed from the direction of the optical axes.

The first embodiment of the present invention will be described. FIGS. 1A, 1B, and 1C schematically illustrate the construction of a laser light multiplexing apparatus according to the first embodiment. FIG. 1A is a schematic plan view of a laser light multiplexing apparatus according to the first embodiment of the present invention. FIG. 1B is a schematic side view of the laser light multiplexing apparatus according to the first embodiment, which is viewed from the direction along which a plurality of semiconductor lasers are arranged. FIG. 1C is a schematic front view of a portion of the laser light multiplexing apparatus according to the first embodiment, which is viewed from the direction of the optical axes.

Figure 2:
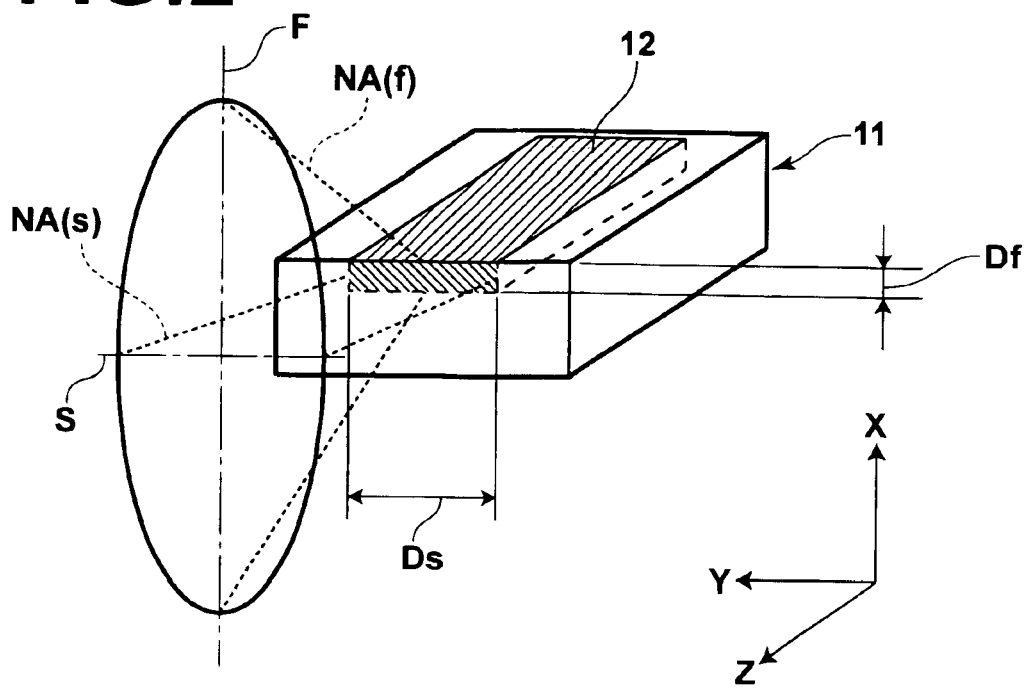
FIG. 2 is a perspective view illustrating emission of a light beam from a semiconductor laser.
Figure 3:
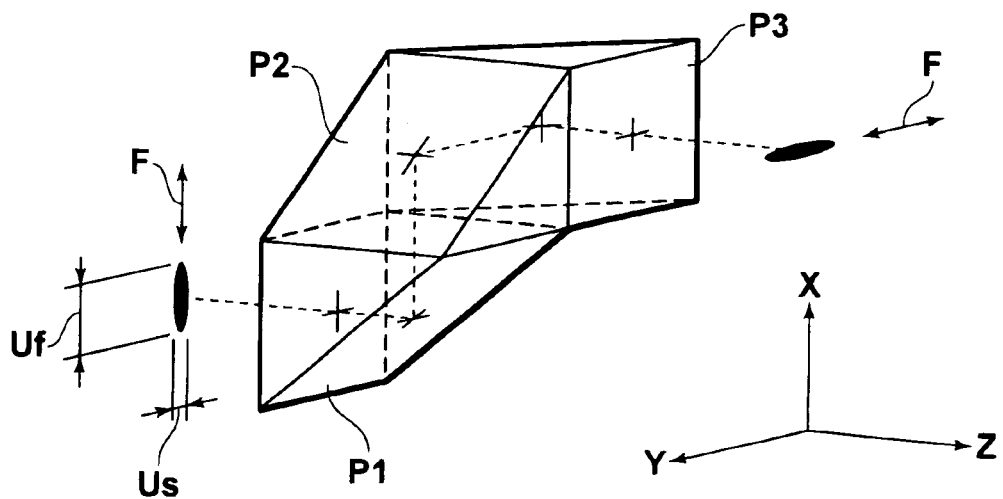
FIG. 3 is a schematic perspective view of one of prisms constituting the light beam rearrangement optical system in the laser light multiplexing apparatus according to the first embodiment.
Figure 4A:
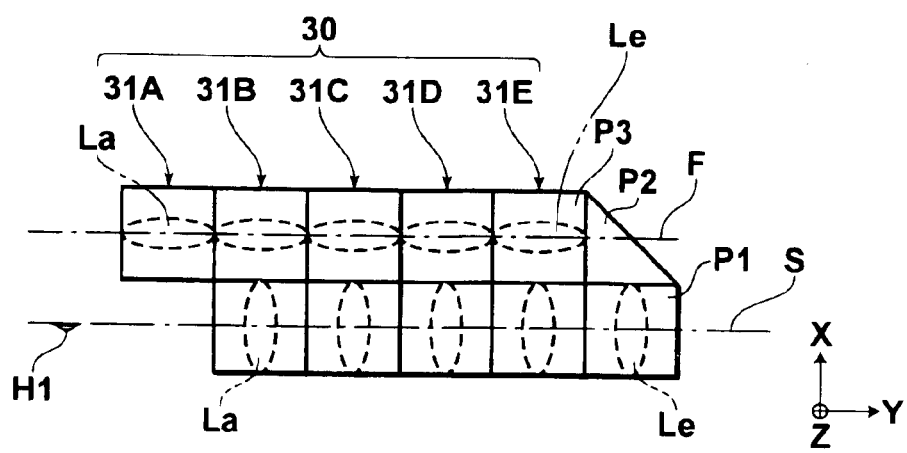
FIG. 4A is a schematic front view of the light beam rearrangement optical system in the laser light multiplexing apparatus according to the first embodiment, which illustrates rearrangement of the light beams.
Figure 4B:
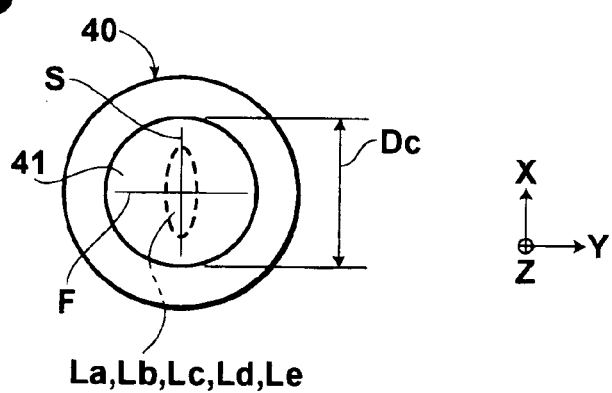
FIG. 4B is a schematic front view of the end face of the optical fiber in the laser light multiplexing apparatus according to the first embodiment, which illustrates optical multiplexing of the light beams into the optical fiber.

FIG. 2 is a perspective view illustrating emission of a light beam from a semiconductor laser. FIG. 3 is a perspective view of a prism which constitutes a light beam rearrangement optical system. FIG. 4A is a schematic front view of the light beam rearrangement optical system, which illustrates rearrangement of the light beams. FIG. 4B is a schematic front view of the end face of the optical fiber, which illustrates optical multiplexing of the light beams into the optical fiber. FIG. 5A is a schematic front view of the light beam rearrangement optical system, which is viewed from the direction of the optical axes. FIG. 5B is a schematic side view of the light beam rearrangement optical system, which is viewed from the direction along which a plurality of semiconductor lasers are arranged. FIG. 5C is a schematic plan view of the light beam rearrangement optical system. FIGS. 6A and 6B are diagrams illustrating convergence of the entire bundle of light beams by the convergence optical system. Note that a collimating optical system, which is arranged between the semiconductor lasers and a light beam rearrangement optical system, is omitted from FIG. 1C.

The laser light multiplexing apparatus of the present invention comprises a laser block 10; a collimating optical system 20; a light beam rearrangement optical system 30; and a convergence optical system 25. A plurality of semiconductor lasers 11A, 11B, 11C . . . (hereinafter collectively called semiconductor lasers 11) are arranged on the laser block 10 in such a manner that active layers 12A, 12B, 12C, . . . of each of the semiconductor lasers 11 are coplanar and are aligned along the Y direction indicated in FIGS. 1A, 1B, and 1C. The collimating optical system 20 collimates light beams La, Lb, Lc, . . . which are emitted from the semiconductor lasers 11 in the Z direction indicated in FIGS. 1A, 1B, so that the collimated light beams La, Lb, Lc, . . . have coplanar slow axes in a plane H1, and the optical axes of the collimated light beams La, Lb, Lc, . . . are parallel in the Z direction. The light beam rearrangement optical system 30 changes the directions of the fast axes of the light beams La, Lb, Lc, . . . collimated by the collimating optical system 20, at different locations along the direction in which the light beams propagate, so that the fast axes of the light beams become coplanar. In FIGS. 1A and 1B, the directions of the slow axes are indicated by S, and the directions of the fast axes are indicated by F. The convergence optical system 25 converges the entire bundle of the light beams rearranged by the light beam rearrangement optical system 30, in the directions of the slow and fast axes, and causes the converged light beams to enter an optical fiber 40. The light beam rearrangement optical system 30 is constituted by prisms 31A, 31B, 31C, . . . (hereinafter, collectively referred to as prisms 31), which arranged in correspondence with each of the light beams La, Lb, Lc, . . . .

Each of the semiconductor lasers 11 is an edge emitting type, nitride compound based semiconductor laser having an oscillation wavelength of 400 to 420 nm and an output power of 1W. As illustrated in FIG. 2, in each semiconductor laser 11, the emission width Df in the direction of its fast axis F is 0.5 $\mu$m, and the emission width Ds in the direction of its slow axis S is 25 $\mu$m. In addition, in each of light beams emitted from the semiconductor lasers 11, the effective numerical aperture NA(f) in the direction of the fast axis F is 0.46, and the effective numerical aperture NA(s) in the direction of the slow axis S is 0.2. Note that the direction of the fast axes F of the semiconductor lasers 11 corresponds to the thickness direction of the active layers of the semiconductor lasers 11, and the direction of the slow axes S of the semiconductor lasers 11 is parallel to the surfaces of the active layers. That is, the direction of the fast axes F is perpendicular to the direction of the slow axes S. Note that in the example of FIGS. 1A, 1B, and 1C, five semiconductor lasers 11A, 11B, 11C, 11D, and 11E are arranged on the laser block 10.

The collimating optical system 20 is constituted by collimator lenses 21A, 21B, 21C, . . . , which are truncated lenses respectively arranged in correspondence with each of the light beams La, Lb, Lc, . . . . Each of the collimator lenses 21A, 21B, 21C, . . . has a focal length f1 of 3 mm and a numerical aperture of 0.6. In addition, each of the light beams collimated by the plurality of truncated collimator lenses 21A, 21B, 21C, . . . has an elliptic cross section having a width Uf of 2.8 mm in the direction of the fast axis and a width Us of 1.2 mm in the direction of the slow axis.

Each of the prisms 31A, 31B, 31C, . . . constituting the light beam rearrangement optical system 30 is formed by combining prism portions P1, P2, and P3 each having a shape of a triangular prism as illustrated in FIG. 3. When the light beams enter the prisms 31A, 31B, 31C in such a manner that the fast axes F are in the X direction, each of the light beams is reflected three times in all in the prism (once in each of the prism portions P1, P2, and P3), and is then outputted so that the fast axes are in the Y direction. That is, as illustrated in FIG. 4A, the light beam rearrangement optical system 30 rearranges the light beams La, Lb, Lc, . . . in which the slow axes are coplanar in the plane H1, into light beams in which the fast axes are coplanar in the Y direction. In the above description, the X, Y, and Z directions are perpendicular to each other. FIGS. 5A, 5B, and 5C are schematic views of the light beam rearrangement optical system 30 from the three directions, where FIG. 5A is a view from the Z direction, FIG. 5B is a view from the Y direction, and FIG. 5C is a view from the X direction.

High reflection coatings realizing reflectance of 99.5% or higher are applied to three surfaces of the prism portions P1, P2, and P3, and antireflection coatings realizing a reflectance of 0.5% or lower are applied to a surface of each prism through which a light beam enters and a surface of each prism through which a light beam is outputted.

As illustrated in FIGS. 6A and 6B, the convergence optical system 25 comprises an F convergence lens 26 and an S convergence lens 27. The F convergence lens 26 converges the entire bundle of the light beams La, Lb, Lc, . . . so that the width of the entire bundle in the direction of the fast axes F (i.e., the Y direction in this case) is reduced. The S convergence lens 27 converges the entire bundle of the light beams La, Lb, Lc, . . . so that the width of the entire bundle in the direction of the slow axes S (i.e., the X direction in this case) is reduced. Thus, the convergence optical system 25 causes the light beams La, Lb, Lc,. . . to enter the core 41 of the optical fiber 40 from an end face of the core 41 as illustrated in FIG. 4B.

The core 41 of the optical fiber 40 has a diameter of 50 μm and a numerical aperture (NA) of 0.2.

The operation of the laser light multiplexing apparatus according to the first embodiment will be described below.

The light beams La, Lb, Lc, . . . emitted from the semiconductor lasers 11 are collimated by the optical convergence system 20 into collimated light beams having parallel optical axes and coplanar slow axes S contained in the plane H1. Then, the collimated light beams La, Lb, Lc, . . . pass through the respectively corresponding prisms 31A, 31B, 31C, . . . and are rearranged so that the fast axes of the light beams La, Lb, Lc, . . . become coplanar as illustrated in FIG. 4A. At this time, it is possible to perform rearrangement of the light beams without interference between adjacent light beams, and generate a bundle of light beams which are close to each other (i.e., realize high space utilization efficiency).

Thereafter, the entire bundle of the light beams, rearranged by the light beam rearrangement optical system 30 so that the fast axes are coplanar, passes through the F convergence lens 26, and is converged so that the width of the bundle in the direction of the fast axes F in the Y-Z plane is reduced. At the same time, the entire bundle of the light beams passes through the S convergence lens 27, and is converged so that the width of the bundle in the direction of the slow axes S in the X-Z plane is reduced. Then, the converged bundle of light beams enters the 50 μm diameter core 41 of the optical fiber 40.

Light beams are converged with higher quality in the directions of the fast axes than in the directions of the slow axes. Therefore, it is possible to couple the five light beams La, Lb, Lc, Ld, and. Le which are aligned in the direction of the fast axes to the core 41 of the optical fiber 40 with high coupling efficiency.

As described above, the light beams, which are emitted from the five semiconductor lasers 11A, 11B, 11C, . . . , each having a power of 1W are coupled to the core 41 of the optical fiber 40. This enables the laser light multiplexing apparatus to output laser light with a power of 4.5 W from the core 41.

That is, the five light beams are coupled to the optical fiber with a coupling efficiency of 90%.

The multiplexing properties of the above apparatus will be described below.

Multiplexing Properties in the Direction of the Fast Axes (Refer to FIG. 6B)

The F convergence lens 26 has a numerical aperture NA=0.2 in the Y-Z plane, which is the same as that of the optical fiber 40. That is, each of the light beams La, Lb, Lc, . . . enter the F convergence lens 26 from the collimating optical system, with a spread angle of approximately NA=0.46 per light beam. In order for the five light beams enter the optical fiber, the numerical aperture NA=0.2 is divided in five. Therefore, the magnification rate of this optical system from the semiconductor lasers 11 to the optical fiber 40 is 0.46/(0.2/5)=11.5.

Accordingly, the magnification rate of the F convergence lens 26 is 11.5 in the direction of the fast axes F. Thus, a focal distance Ff, in the direction of the fast axes, of 34.5 mm (the focal distance of each of the collimating lenses 3 mm×the magnification rate 11.5) becomes necessary.

In addition, the blur (spread) of the light beams during convergence in the direction of the fast axes is determined by the following formula.

$$\Delta s = (4/\Pi) \times \lambda \times Ff/Tf$$

wherein λ: the wavelength of the light beams to be multiplexed; Ff: the focal distance in the direction of the fast axes on the converged side; and Tf: the width of the entire bundle of light beams in the direction of the fast axes.

If the wavelength λ is 0.4 μm, the focal distance Ff is 34.5 mm, and the width of the bundle of light beams Tf is 3.1 mm, the blur (spread) Δs of the light beams in the direction of the fast axes is approximately 5.7 μm. The converged light beams have a spread of approximately 11.5 μm (0.5×11.5 μm+5.7 μm) in the direction of the fast axes.

Multiplexing Properties in the Direction of the Slow Axes (Refer to FIG. 6A)

The S convergence lens 27 has a numerical aperture NA=0.2 in the X-Z plane, which is the same as that of the optical fiber 40. That is, the light beams La, Lb, Lc, . . . enter the S convergence lens 27 from the collimating optical system in a state in which the slow axes S thereof are stacked in the Y direction, with a spread angle of approximately NA=0.2. Thereafter, the entire bundle of light beams enters the optical fiber 40, which has a numerical aperture of NA=0.2. Therefore, the magnification rate of this optical system from the semiconductor lasers 11 to the optical fiber 40 is 0.2/0.2=1.

Accordingly, the magnification rate of the S convergence lens 27 is 1 in the direction of the slow axes S. Thus, a focal distance Fs, in the direction of the slow axes, of 3 mm (the focal distance of each of the collimating lenses 3 mm×the magnification rate 1) becomes necessary.

In addition, the blur (spread) of the light beams during convergence in the direction of the slow axes is determined by the following formula.

$$\Delta s = (4/\pi) \times \lambda \times Fs/Ts$$

wherein λ: the wavelength of the light beams to be multiplexed; Fs: the focal distance in the direction of the slow axes on the converged side; and Ts: the width of the entire bundle of light beams in the direction of the slow axes.

If the wavelength λ is 0.4 μm, the focal distance Fs is 3 mm, and the width of the bundle of light beams Ts is 1.2 mm, the blur (spread) Δs of the light beams in the direction of the fast axes is approximately 1.3 μm. The converged light beams have a spread of approximately 26.3 μm (25 μm+1.3 μm) in the direction of the slow axes.

Here, the cross section of the bundle of five light beams multiplexed onto the core 41 of the optical fiber 40 becomes an ellipse. The minor axis of the ellipse (in the direction of the fast axes, which is the Y direction) is approximately 11.5 μm, and the major axis of the ellipse (in the direction of the slow axes, which is the X direction) is approximately 26.3 μm (refer to FIG. 4B).

As described above, the diameter of the bundle of light beams converged onto the end face of the optical fiber is 30 μm or less, even considering blur of the light beams due to diffraction. This value is less than the diameter of the core (Dc=50 μm) of the optical fiber. Therefore, it is possible to couple the bundle of light beams to the optical fiber with high coupling efficiency.

Note that the greatest factor that determines the device size of a laser light multiplexing apparatus is the volume required to house optical elements therein. The dimension in the direction that the light beams propagate of the above laser light multiplexing apparatus is 3 mm (the focal distance of the collimating lenses) and 34.5 mm (the focal distance of the convergence optical system). Therefore, even if the dimensions of the other parts are included, the entire length of the apparatus can be kept within 50 mm, enabling miniaturization.

Figure 9A:
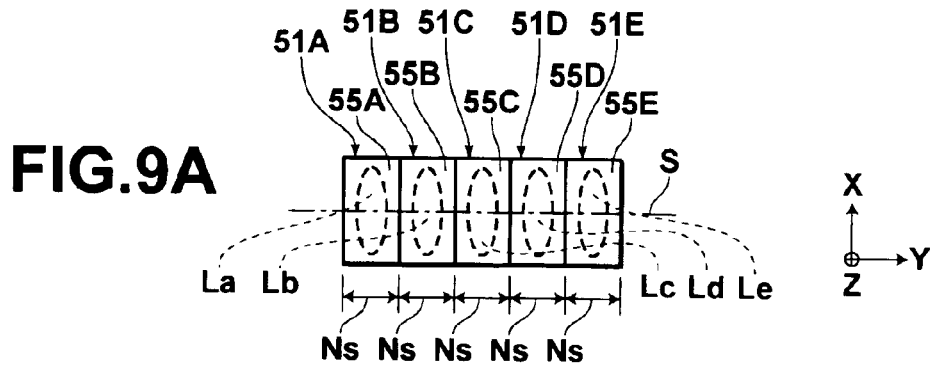
FIG. 9A is a perspective front view of the light beam rearrangement optical system in the laser light multiplexing apparatus according to the second embodiment, which shows entrance of light beams into the light beam rearrangement optical system.
Figure 9B:
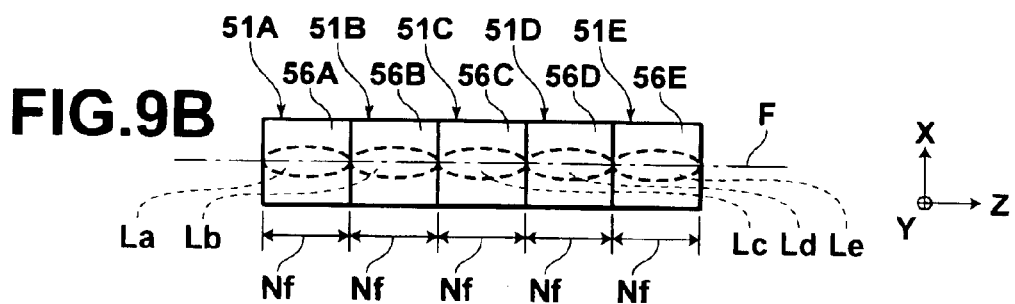
FIG. 9B is a perspective front view of the light beam rearrangement optical system in the laser light multiplexing apparatus according to the second embodiment, which shows output of light beams from the light beam rearrangement optical system.
Figure 9C:
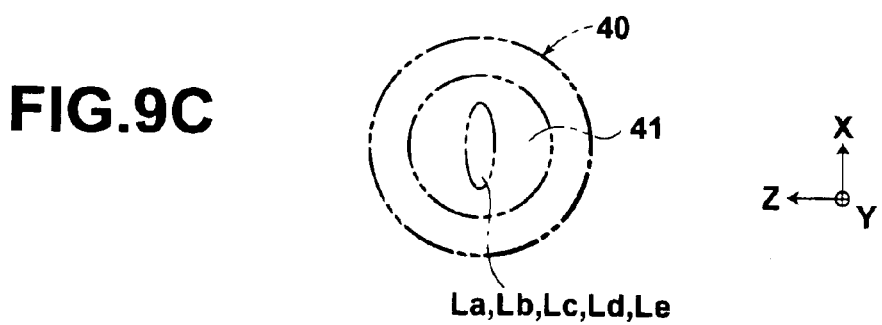
FIG. 9C is a schematic front view of the end face of an optical fiber in the laser light multiplexing apparatus in the laser light multiplexing apparatus according to the second embodiment, which illustrates optical multiplexing of the light beams in the optical fiber.

Alternatively, the light beam rearrangement optical system may be of a construction as described hereinafter. FIG. 7 is a schematic plan view of an alternate form of the light beam rearrangement optical system. FIG. 8 is a perspective view of one of a plurality of prisms that constitute the light beam rearrangement optical system of FIG. 7. FIG. 9A is a perspective front view of the light beam rearrangement optical system, which shows entrance of light beams into the light beam rearrangement optical system. FIG. 9B is a perspective front view of the light beam rearrangement optical system, which shows output of light beams from the light beam rearrangement optical system. FIG. 9C is a schematic front view of the end face of an optical fiber, which illustrates optical multiplexing of the light beams into the optical fiber.

As shown in FIGS. 7, 9A, 9B, and 9C, a light beam rearrangement optical system 50 is constituted by a plurality of prisms 51A, 51B, 51C, . . . Each of the prisms 51A, 51B, 51C, . . . is formed by combining two quadratic prism portions P11 and P12, as shown in FIG. 8. The prisms 51A, 51B, 51C, . . . are provided so that light beams, of which the direction of the slow axes S are in the Y direction, enter thereinto. The light beams are reflected a total of two times (once at the prism portion P11 and once at the prism portion P12), then are output so that the direction of the fast axes F are in the Z direction. The light beams La, Lb, Lc, . . . , which are emitted from the semiconductor lasers 11, are collimated by the collimating optical system 20 so that they have parallel optical axes and coplanar slow axes. The collimated light beams La, Lb, Lc, . . . respectively enter the prisms 51A, 51B, 51C, . . . (refer to FIG. 9A), are rearranged thereby so that the fast axes of each of the light beams La, Lb, Lc, . . . become coplanar, then output from the prisms 51A, 51B, 51C, . . . (refer to FIG. 9B) Here, it is possible to perform rearrangement of the light beams without interference between adjacent light beams, and to generate a bundle formed by light beams which are close to each other (i.e., realize high space utilization efficiency).

The bundle of light beams, which have been rearranged so that their fast axes are coplanar, is output from the light beam rearrangement optical system 50. Then, the bundle of light beams is converged by the convergence optical system 25 so that the widths in both the direction of the fast axes F and the direction of the slow axes S are reduced. The converged bundle of light beams is then multiplexed into the 50 μm diameter core 41 of the optical fiber 40.

Note that the direction that the light beams enter the light beam rearrangement optical system (the Z direction) and the direction that the light beams are output from the light beam rearrangement optical system (the Y direction) are different from each other. Therefore, the widths Ns (refer to FIG. 9A) of light entrance surfaces 55A, 55B, 55C, . . . of the prisms 51A, 51B, 51C, . . . in the Y direction (the direction of the slow axes S) are not limited by the widths Nf (refer to FIG. 9B) of light output surfaces 56A, 56B, 56C, . . . in the Z direction (the direction of the fast axes F). Accordingly, the widths Ns of the light entrance surfaces 55A, 55B, 55C, . . . can be set to be substantially equal to the widths of the light beams in the direction of the slow axes thereof. Thus, the intervals among the light beams, which enter the light beam rearrangement optical system, can be further narrowed. Thereby, the dimensions of the laser lock and the collimating lenses can be further reduced, which enables further miniaturization of the laser light multiplexing apparatus.

Hereinafter, various embodiments of the laser light multiplexing apparatus will be described.

First, the features, which are common among embodiments Ex1 through Ex9, will be described.

As illustrated in FIGS. 10 through 26, the laser light multiplexing apparatuses of embodiments Ex1 through Ex9 comprise laser blocks 111B, 112B, and 115B through 119B, on which five semiconductor lasers are respectively provided, as well as laser blocks 113B and 114B, on which ten semiconductor lasers are provided. The semiconductor lasers are provided on each of the laser blocks such that the active layers are coplanar. The light beams emitted from each of the semiconductor lasers have parallel, coplanar slow axes.

Note that each of the semiconductor lasers is an edge emitting type, nitride compound based semiconductor laser having an oscillation wavelength of 400 to 420 nm and an output power of 1W. The emission width Df in the direction of the fast axis F of the light beam emitted from each semiconductor laser is 0.5 μm, and the effective numerical aperture NA(f) in the direction of the fast axis is 0.46. The emission width Ds in the direction of the slow axis S is 25 μm in the laser blocks 111B and 112B, 30 μm in the laser blocks 113B, 114B, and 115B, and 50 μm in the laser blocks 116B, 117B, 118B, and 119B. The effective numerical aperture NA(s) in the direction of the slow axis S is 0.2 for all of the laser blocks.

Note that the "direction of the fast axes" and the "direction of the slow axes" in the description below refer to the states of the slow axes and the fast axes of each light beam. That is, in the case that the direction of the light beam is rotated about the optical axis thereof, the "direction of the fast axes" and the "direction of the slow axes" are also rotated about the X axis, the Y axis, or the Z axis in the figures. Therefore, the relationships among the direction of the fast axes, the direction of the slow axes, the X axis, the Y axis, and the Z axis vary, depending on the position within the optical path.

In the figures, the direction opposite that of the arrow +X is −X, the direction opposite that of the arrow +Y is −Y, and the direction opposite that of the arrow +Z is −Z.

Collimating optical systems 111C and 112C are provided, corresponding to the laser blocks 111B, 112B. Collimating optical systems 115C, 116C, 117C, 118C, and 119C are provided, corresponding to the laser blocks 115B, 116B, 117B, 118B, and 119B. Collimating optical systems 113C and 114C are provided corresponding to the laser blocks 113B and 114B. All of the collimating optical systems comprise truncated lenses. The collimating optical systems collimate the light beams emitted from each of the semiconductor lasers such that the optical axes thereof are parallel, and the slow axes thereof become parallel and coplanar.

The focal distances of all of the collimating optical systems 111C through 119C are 2.85 mm, and the numerical apertures NA are 0.6. The sectional shape of each collimated light beam is an ellipse with a width of 2.6 mm in the direction of the fast axis and a width of 1.1 mm in the direction of the slow axis.

Light beam rearrangement optical systems 111R through 119R are provided corresponding to the collimating optical systems 111C through 119C. The light beam rearrangement optical systems 111R through 119R change the directions of the fast axes (denoted by arrows F in the figures) of the light beams collimated by the collimating optical system 111C through 119C, at different locations along the direction in which the light beams propagate, so that the fast axes of the light beams become parallel and coplanar. Light beams that enter the light beam rearrangement optical systems 111R through 119R are rearranged into light beams having parallel coplanar fast axes, then output.

Note that the light beam rearrangement optical systems 111R through 119R are constructed by combinations of isosceles right triangular prism portions Pt; quadratic prism-shaped transmitting portions Ps; dichroic coating films Cd for wavelength multiplexing; polarization coating films Cp for polarization multiplexing; and the like. Note that a high reflection coating that realizes reflectance of 99.5% or greater is applied on reflection surfaces Sr of the triangular prisms Pt. The reflection surfaces Sr are surfaces that face the right angle ridge of the isosceles right triangle. An antireflection coating that realizes reflectance of 0.5% or lower is applied to light entrance surfaces and light output surfaces (light transmitting surfaces) St of the triangular prisms Pt. The transmitting surfaces S1 are surfaces that correspond to the equilateral sides of the isosceles light triangle.

Convergence optical systems 111F through 119F are provided, corresponding to the light beam rearrangement optical systems 111R through 119R. The convergence optical systems 111F through 119F converge light beams input thereto, which have parallel coplanar fast axes, in both the direction of the fast axes and the direction of the slow axes. The convergence optical systems 111F through 119F output the converged light beams so that they enter optical fibers 111L through 119L, respectively.

The convergence optical systems 111F through 119F respectively comprise F convergence lenses 111Ff through 119Ff and S convergence lenses 111Fs through 119Fs. The F convergence lenses 111Ff through 119Ff are cylindrical lenses that converge the entire bundle of light beams, which has been respectively emitted from the light beam rearrangement optical systems 111R through 119R, so that the width of the entire bundle in the direction of the fast axes (the Y direction in this case) is reduced. The S convergence lenses 111Fs through 119Fs are cylindrical lenses that converge the entire bundle of light beams so that the width of the entire bundle in the direction of the slow axes (the X direction in this case) is reduced. The convergence optical systems 111F through 119F multiplex the light beams and cause them to enter the end faces of cores of the optical fibers 111L through 119L, respectively.

The effective numerical aperture of the cores of all of the optical fibers 111L through 119L is 0.22. The diameter of the cores of the optical fibers 111L and 112L is 50 μm. The diameter of the cores of the optical fibers 113L through 119L is 60 μm.

Figure 27A:
FIGS. 27A, 27B, 27C, and 27D illustrate states in which the light beams are arranged as they enter the convergence optical system.
Figure 27B:
Figure 27C:
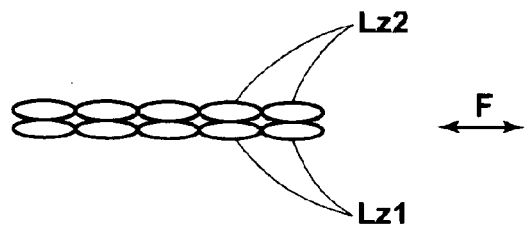
Figure 27D:
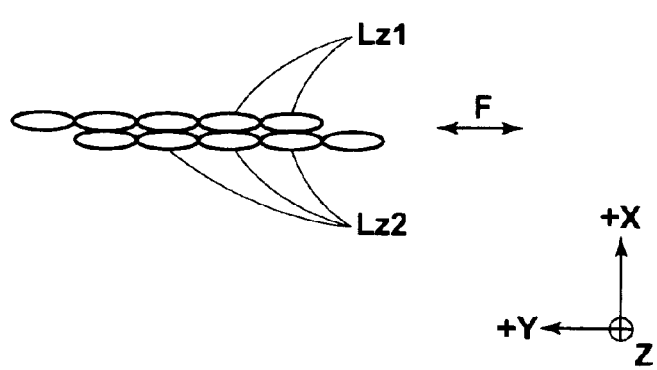
Figure 29A:
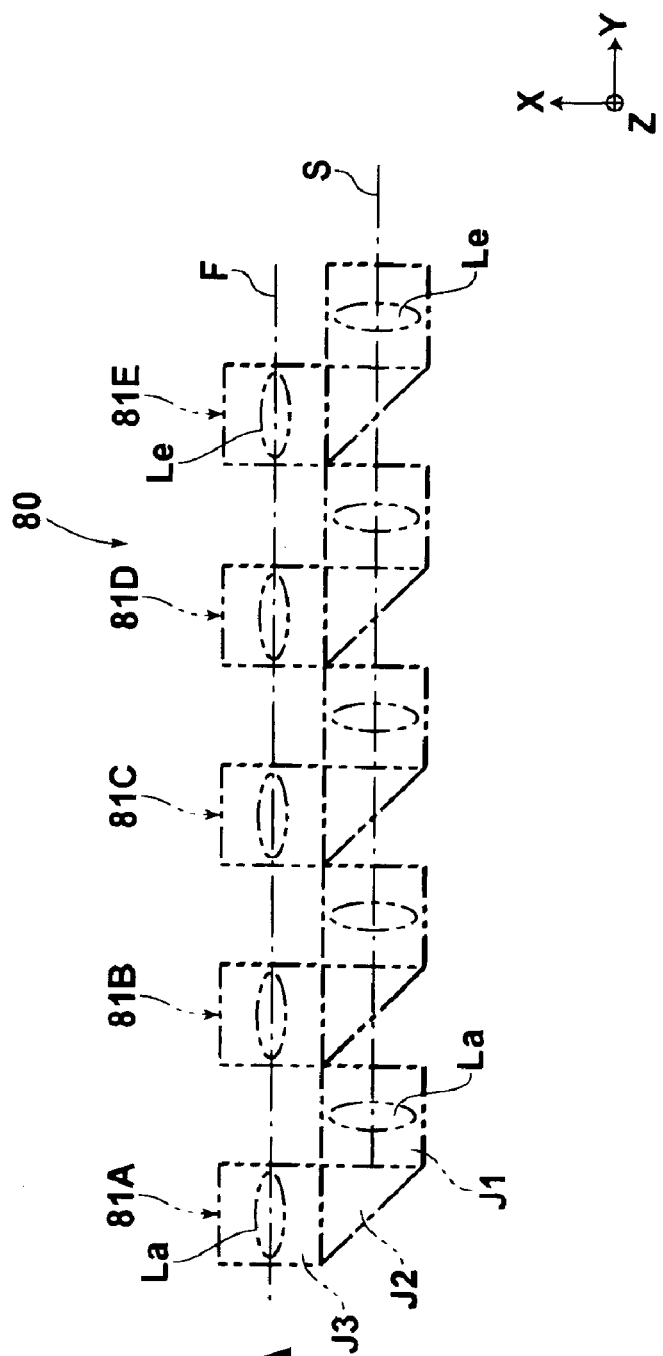
FIG. 29A is a schematic front view of the light beam rearrangement optical system in the conventional laser light multiplexing apparatus, which illustrates rearrangement of the light beams.
Figure 29B:
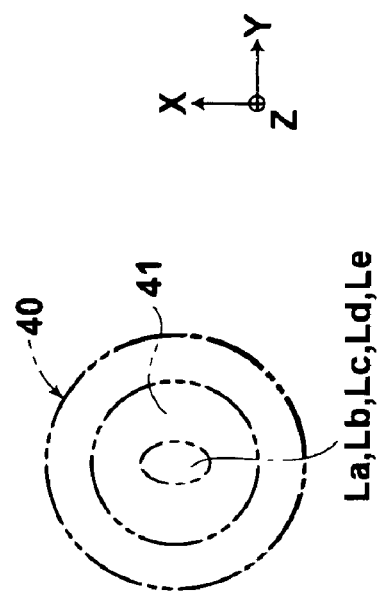
FIG. 29B is a schematic front view of the end face of the optical fiber in the conventional laser light multiplexing apparatus, which illustrates optical multiplexing of the light beams in the optical fiber.
Figure 30:
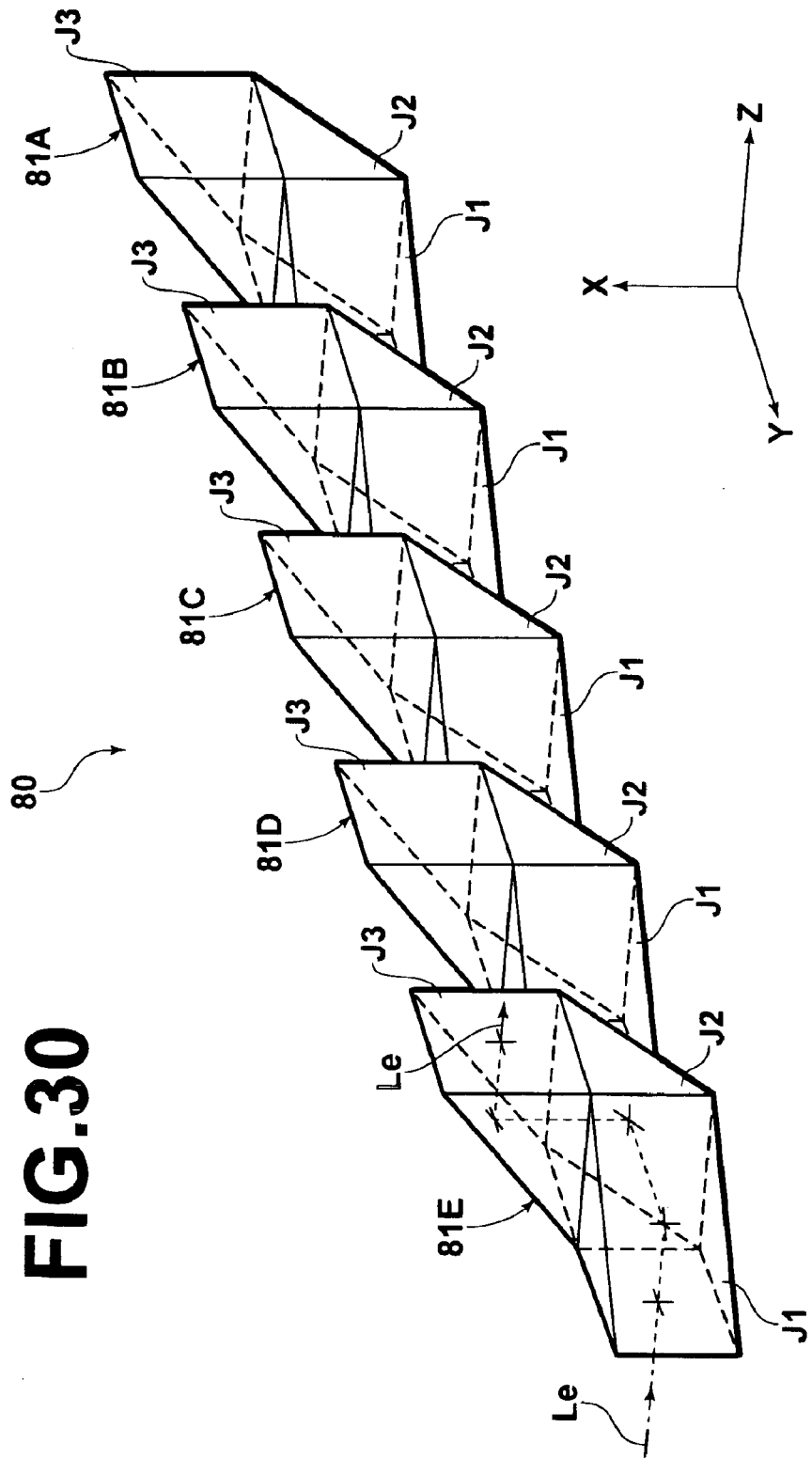
FIG. 30 is a perspective view of the light beam rearrangement optical system in the conventional laser light multiplexing apparatus, which illustrates arrangement of prisms constituting the light beam rearrangement optical system.

Note that FIG. 27A shows the state of light beams as they enter the convergence optical systems 111F, 112F, 116F, 117F, 118F, and 119F of embodiments Ex1, Ex2, Ex6, Ex7, Ex8, and Ex9, viewed in the direction of the optical axes from the side of the convergence optical systems. FIG. 27B shows the state of light beams as they enter the convergence optical system 113F of embodiment Ex3, viewed in the direction of the optical axes from the side of the convergence optical system 113F. FIG. 27C shows the state of light beams as they enter the convergence optical system 114F of embodiment Ex4, viewed in the direction of the optical axes from the side of the convergence optical system 114F. FIG. 27D shows the state of light beams as they are emitted by the convergence optical system 115F of embodiment Ex5, viewed in the direction of the optical axes from the side of the convergence optical system 115F.

Embodiment Ex1

Figure 11:
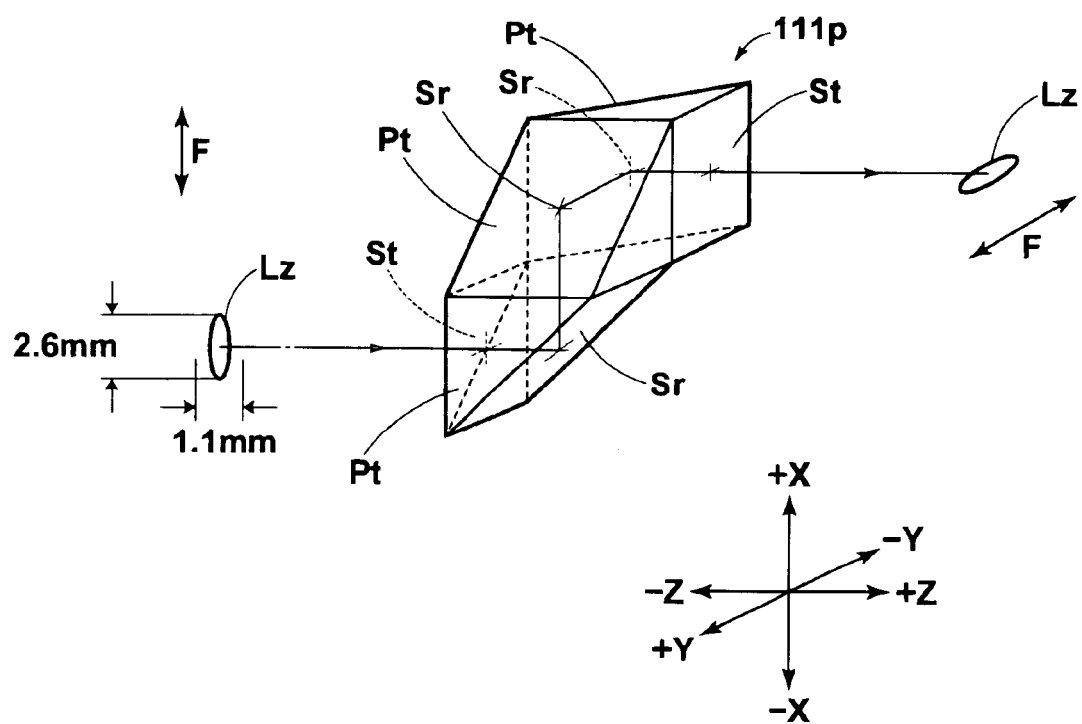
FIG. 11 is an enlarged perspective view of a prism which is utilized in the light beam rearrangement optical system.

FIGS. 10A and 10B are schematic views illustrating the construction of a laser light multiplexing apparatus 101 according to Embodiment Ex1. FIG. 10A is a plan view of the laser light multiplexing apparatus 101. FIG. 10B is a front view of the laser multiplexing apparatus 101. FIG. 11 is a perspective view of a prism which is utilized in the light beam rearrangement optical system.

The laser light multiplexing apparatus 101 of embodiment Ex1 comprises: the laser block 111B, on which five semiconductor lasers are provided; the collimating optical system 111C; the light beam rearrangement optical system 111R; the convergence optical system 111F; and the optical fiber 111L.

Note that as described above, the emission width Ds in the direction of the slow axes, of the light beams emitted from the five semiconductor lasers provided on the laser block 111B, is 25 μm. The focal distance of the convergence optical system 111F is 30 mm in the direction of the fast axes and 2.85 mm in the direction of the slow axes. The core diameter of the optical fiber 111L is 50 μm.

The light beam rearrangement optical system 111R comprises five prisms 111p. Each prism 111p is a combination of three triangular prism portions Pt, as previously described with reference to FIG. 3. The five prisms 111p are respectively provided corresponding to each of five light beams, which have passed through the collimating optical system 111C, at different positions in the direction that the light beams propagate.

Five light beams Lz are emitted from the semiconductor lasers of the laser block 111B in the +Z direction. The light beams Lz are collimated by the collimating optical system 111C so that the optical axes thereof become parallel, and the slow axes thereof become coplanar. Each of the collimated light beams Lz further propagate in the +Z direction and pass through the prism 111p, of the light beam rearrangement optical system 111R, corresponding thereto. The light beams Lz are rearranged such that the fast axes thereof become parallel and coplanar. Rearrangement of the light beams is realized without interference between adjacent light beams, and a bundle of light beams, which are close to each other (i.e., realize high space utilization efficiency), is generated.

The light beam Lz which propagates in the +Z direction enters the first triangular prism portion Pt of the prism 111p. The light beam Lz is first reflected toward the +X direction and enters the second triangular prism portion Pt. Then, the light beam Lz is reflected toward the −Y direction by the second triangular prism portion Pt, and enters the third triangular prism portion Pt. Thereafter, the third triangular prism portion Pt reflects the light beam Lz toward the +Z direction.

The rearranged light beams Lz, which have parallel coplanar fast axes, are emitted from the light beam rearrangement optical system 111R as a bundle (refer to FIG. 27A). The bundle of light beams is converged in the YZ plane by the F convergence lens 111Ff so that the width thereof in the direction of the fast axes is reduced. Then, the bundle of light beams is converged in the XZ plane by the S convergence lens 111Fs so that the width thereof in the direction of the slow axes is reduced. Thereafter, the converged bundle of light beams enters the core of the optical fiber 111L.

Here, the spot of the bundle of light, which is converged on the end face of the 50 μm diameter core of the optical fiber 111L, is 5 μm long in the direction of the fast axes and 25 μm long in the direction of the slow axes. Note that the above is a rough calculation based only on the magnification rate of the optical systems, which does not take into account blur due to diffraction. In this manner, the light beams emitted from the semiconductor lasers are capable of being converged with higher quality in the direction of the fast axes than in the direction of the slow axes. Therefore, the bundle of light beams Lz is capable of being coupled to the optical fiber 111L at a high coupling efficiency, for example, at a coupling efficiency of 90%.

Embodiment Ex2

Figure 13:
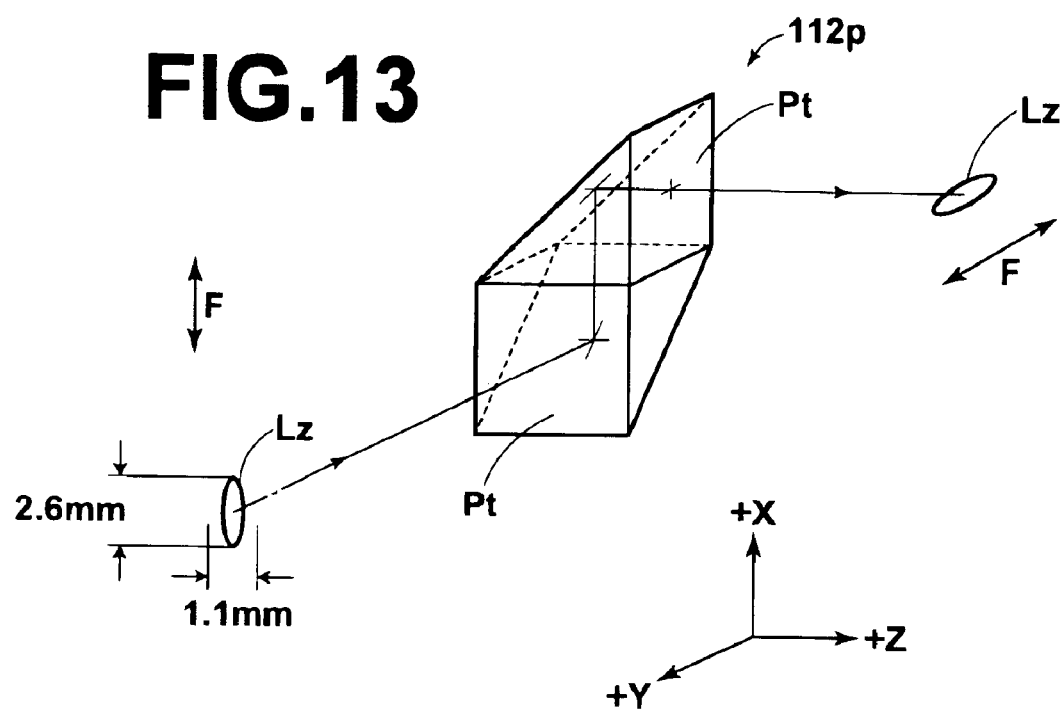
FIG. 13 is an enlarged perspective view of a prism which is utilized in the light beam rearrangement optical system.

FIGS. 12A and 12B are schematic views illustrating the construction of a laser light multiplexing apparatus 102 according to Embodiment Ex2. FIG. 12A is a plan view of the laser light multiplexing apparatus 102. FIG. 12B is a front view of the laser multiplexing apparatus 102. FIG. 13 is a perspective view of a prism which is utilized in the light beam rearrangement optical system.

The laser light multiplexing apparatus 102 of embodiment Ex1 comprises: the laser block 112B, on which five semiconductor lasers that emit light beams in the −Y direction are provided; the collimating optical system 112C; the light beam rearrangement optical system 112R; the convergence optical system 112F; and the optical fiber 112L.

Note that as described above, the emission width Ds in the direction of the slow axes, of the light beams emitted from the five semiconductor lasers provided on the laser block 112B, is 25 μm. The focal distance of the convergence optical system 112F is 30 mm in the direction of the fast axes and 2.85 mm in the direction of the slow axes. The core diameter of the optical fiber 112L is 50 μm.

The light beam rearrangement optical system 112R comprises five prisms 112p. Each prism 112p is a combination of two triangular prism portions Pt. The five prisms 112p are respectively provided corresponding to each of five light beams, which have passed through the collimating optical system 112C, at different positions in the direction that the light beams propagate.

Five light beams Lz are emitted from the semiconductor lasers of the laser block 112B in the −Y direction. The light beams Lz are collimated by the collimating optical system 112C so that the optical axes thereof become parallel, and the slow axes thereof become coplanar. Each of the collimated light beams Lz further propagate in the −Y direction and pass through the prism 112p, of the light beam rearrangement optical system 112R, corresponding thereto. The light beams Lz are rearranged such that the fast axes thereof become parallel and coplanar, then are emitted in the +Z direction. Rearrangement of the light beams is realized without interference between adjacent light beams, and a bundle of light beams, which are close to each other (i.e., realize high space utilization efficiency), is generated.

The light-beam Lz which propagates in the −Y direction enters the first triangular prism portion Pt of the prism 112p. The light beam Lz is first reflected toward the +X direction and enters the second triangular prism portion Pt. Then, the light beam Lz is reflected toward the +Z direction by the second triangular prism portion Pt.

The rearranged light beams Lz, which have parallel coplanar fast axes, are emitted from the light beam rearrangement optical system 112R as a bundle (refer to FIG. 27A). The bundle of light beams is converged in the YZ plane by the F convergence lens 112Ff so that the width thereof in the direction of the fast axes is reduced. Then, the bundle of light beams is converged in the XZ plane by the S convergence lens 112Fs so that the width thereof in the direction of the slow axes is reduced. Thereafter, the converged bundle of light beams enters the core of the optical fiber 112L.

Here, the spot of the bundle of light, which is converged on the end face of the 50 μm diameter core of the optical fiber 111L, is 5 μm long in the direction of the fast axes and 25 μm long in the direction of the slow axes. Note that the above is a rough calculation based only on the magnification rate of the optical systems, which does not take into account blur due to diffraction. In this manner, the light beams emitted from the semiconductor lasers are capable of being converged with higher quality in the direction of the fast axes than in the direction of the slow axes. Therefore, the bundle of light beams Lz is capable of being coupled to the optical fiber 111L at a high coupling efficiency, for example, at a coupling efficiency of 90%.

Embodiment Ex3

Figure 14A:
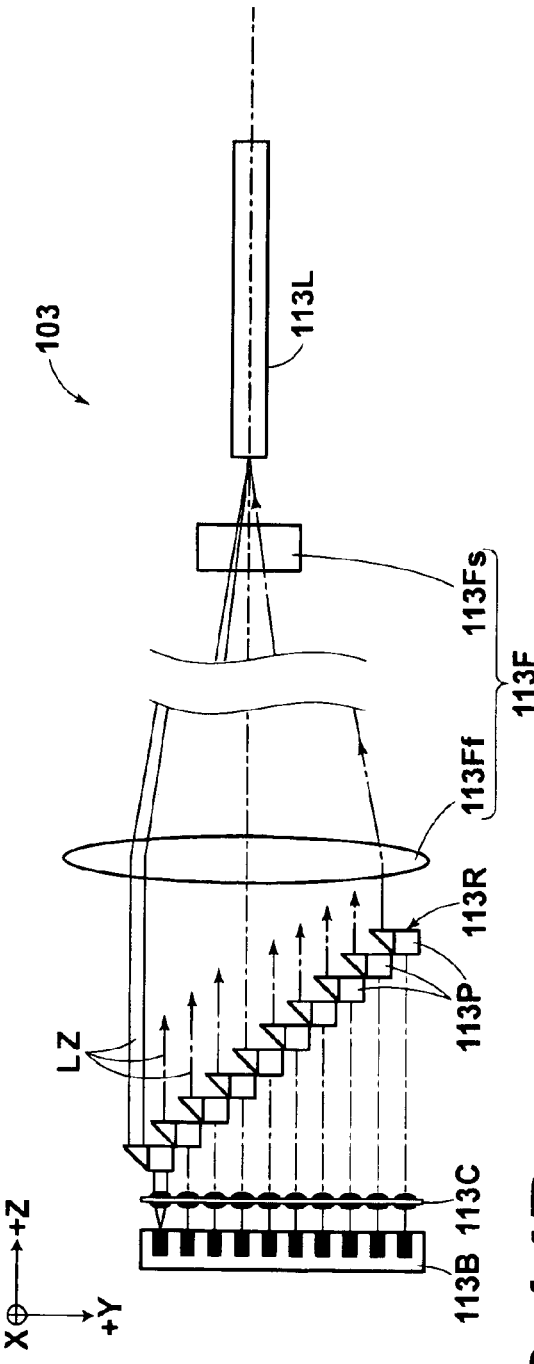
FIGS. 14A and 14B are schematic views illustrating the construction of a laser light multiplexing apparatus according to Embodiment Ex3.
Figure 14B:
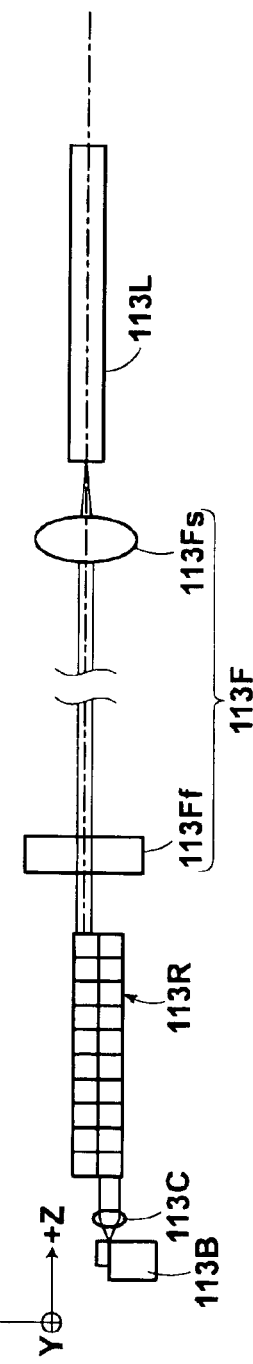

FIGS. 14A and 14B are schematic views illustrating the construction of a laser light multiplexing apparatus 103 according to Embodiment Ex3. FIG. 14A is a plan view of the laser light multiplexing apparatus 103. FIG. 14B is a front view of the laser multiplexing apparatus 103.

The laser light multiplexing apparatus 103 of embodiment Ex3 comprises: the laser block 113B, on which ten semiconductor lasers that emit light beams in the +Z direction are provided; the collimating optical system 113C; the light beam rearrangement optical system 113R; the convergence optical system 113F; and the optical fiber 113L.

Note that as described above, the emission width Ds in the direction of the slow axes, of the light beams emitted from the ten semiconductor lasers provided on the laser block 113B, is 30 μm. The focal distance of the convergence optical system 113F is 60 mm in the direction of the fast axes and 2.85 mm in the direction of the slow axes. The core diameter of the optical fiber 113L is 60 μm.

The light beam rearrangement optical system 113R comprises ten prisms 113p. Each prism 113p is a combination of three triangular prism portions Pt, as previously described with reference to FIGS. 3 and 11. The ten prisms 113p are respectively provided corresponding to each of ten light beams, which have passed through the collimating optical system 113C, at different positions in the direction that the light beams propagate.

Ten light beams Lz are emitted from the semiconductor lasers of the laser block 113B in the +Z direction. The light beams Lz are collimated by the collimating optical system 113C so that the optical axes thereof become parallel, and the slow axes thereof become coplanar. Each of the collimated light beams Lz further propagate in the +Z direction and pass through the prism 113p, of the light beam rearrangement optical system 113R, corresponding thereto. The light beams Lz are rearranged in the same manner as that in embodiment Ex1, such that the fast axes thereof become parallel and coplanar. The rearranged light beams Lz1 are emitted in the +Z direction from the light beam rearrangement optical system 113R. Rearrangement of the light beams is realized without interference between adjacent light beams, and a bundle of light beams, which are close to each other (i.e., realize high space utilization efficiency), is generated.

The rearranged light beams Lz, which have parallel coplanar fast axes, are emitted from the light beam rearrangement optical system 113R as a bundle (refer to FIG. 27B). The bundle of light beams is converged in the YZ plane by the F convergence lens 113Ff so that the width thereof in the direction of the fast axes is reduced. Then, the bundle of light beams is converged in the XZ plane by the S convergence lens 113Fs so that the width thereof in the direction of the slow axes is reduced. Thereafter, the converged bundle of light beams enters the 60 μm diameter core of the optical fiber 113L.

Here, the spot of the bundle of light, which is converged on the end face of the core of the optical fiber 113L, is 10 μm long in the direction of the fast axes and 30 μm long in the direction of the slow axes. Note that the above is a rough calculation based only on the magnification rate of the optical systems, which does not take into account blur due to diffraction. In this manner, the light beams emitted from the semiconductor lasers are capable of being converged with higher quality in the direction of the fast axes than in the direction of the slow axes. Therefore, the bundle of light beams Lz is capable of being coupled to the optical fiber 113L at a high coupling efficiency, for example, at a coupling efficiency of 90%.

Embodiment Ex4

Figures 15A, 15B:
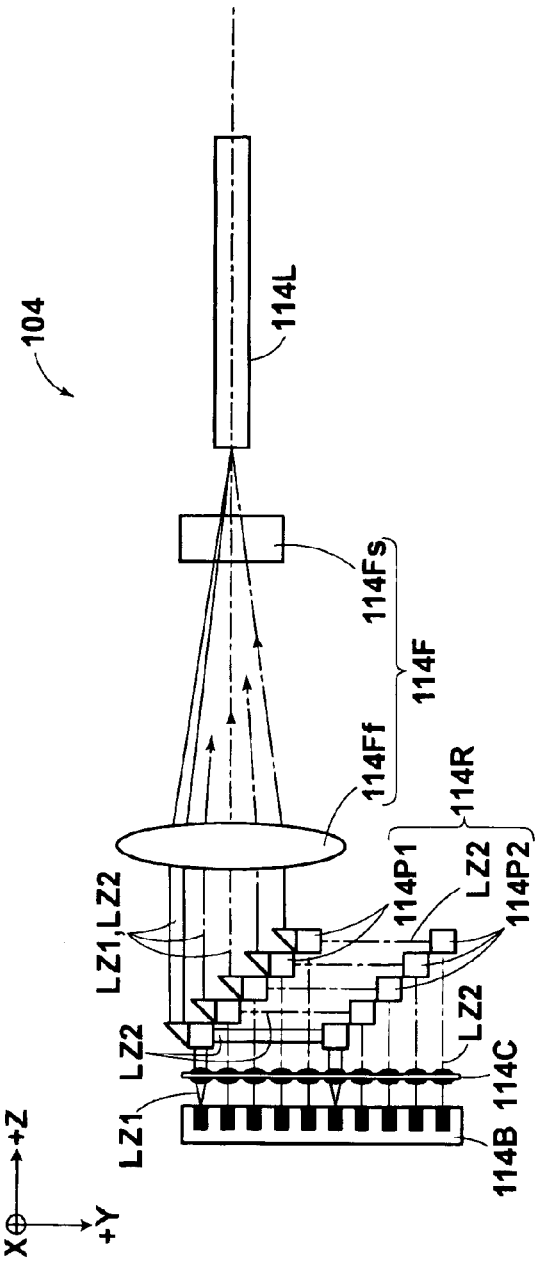
FIGS. 15A and 15B are schematic views illustrating the construction of a laser light multiplexing apparatus according to Embodiment Ex4.
Figure 16:
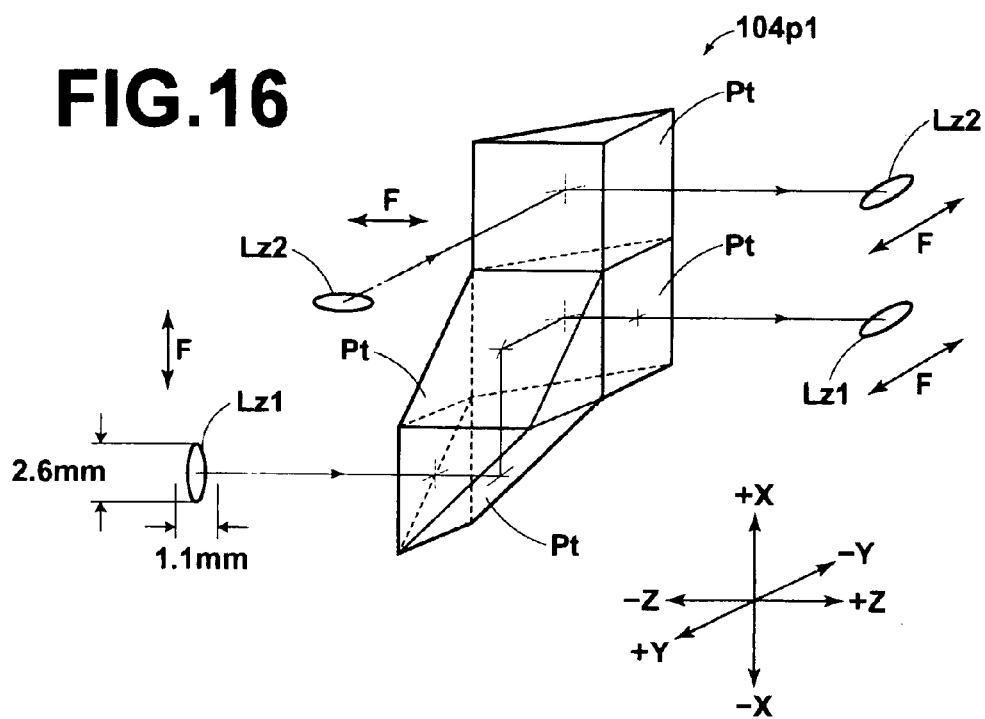
FIG. 16 is an enlarged perspective view of a prism which is utilized in the light beam rearrangement optical system.
Figure 17:
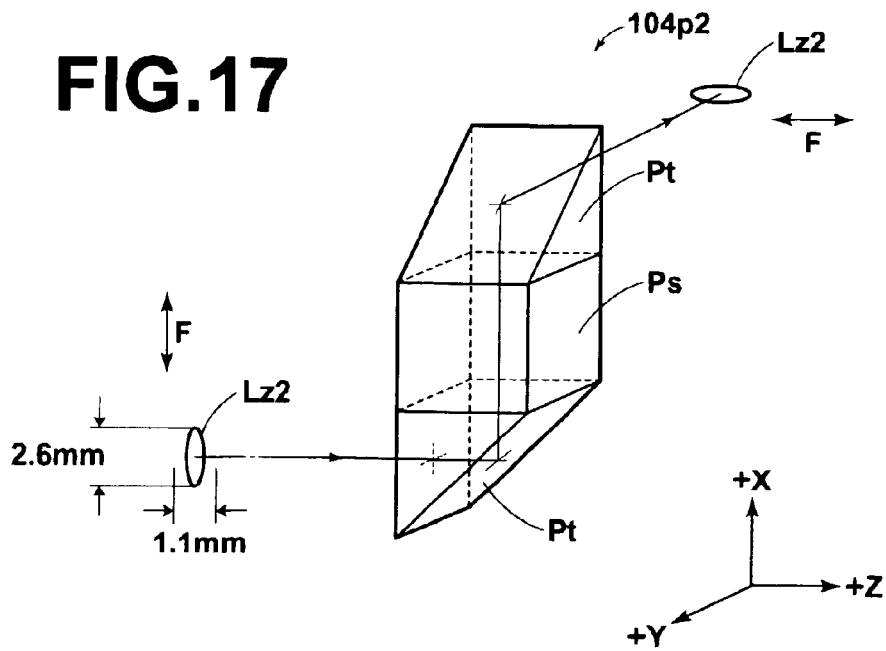
FIG. 17 is an enlarged perspective view of a prism which is utilized in the light beam rearrangement optical system.

FIGS. 15A and 15B are schematic views illustrating the construction of a laser light multiplexing apparatus 104 according to Embodiment Ex4. FIG. 15A is a plan view of the laser light multiplexing apparatus 104. FIG. 15B is a front view of the laser multiplexing apparatus 104. FIG. 16 is a perspective view of a first prism which is utilized in the light beam rearrangement optical system. FIG. 17 is a perspective view of a second prism which is utilized in the light beam rearrangement optical system.

The laser light multiplexing apparatus 104 of embodiment Ex4 comprises: the laser block 114B, on which ten semiconductor lasers that emit light beams in the +Z direction are provided; the collimating optical system 114C; the light beam rearrangement optical system 114R; the convergence optical system 114F; and the optical fiber 114L.

Note that as described above, the emission width Ds in the direction of the slow axes, of the light beams emitted from the ten semiconductor lasers provided on the laser block 114B, is 30 μm. The focal distance of the convergence optical system 114F is 30 mm in the direction of the fast axes and 5.9 mm in the direction of the slow axes. The core diameter of the optical fiber 114L is 60 μm.

The light beam rearrangement optical system 114R comprises five prisms 114p1 and five prisms 114p2, illustrated in FIG. 16 and FIG. 17, respectively. Each prism 114p1 is a combination of four triangular prism portions Pt. Each prism 114p2 is a combination of a quadratic prism-shaped transmitting portion Ps and two triangular prism portions Pt provided so as to sandwich the quadratic prism-shaped transmitting portion Ps therebetween. The five prisms 114p1 are combinations of the prism shown in FIG. 3 or FIG. 11 and an additional triangular prism portion Pt.

The five prisms 114p1 are respectively provided corresponding to five of the ten light beams, which have passed through the collimating optical system 114C, at different positions in the direction that the light beams propagate. The five prisms 114p2 are respectively provided corresponding to the remaining five light beams, which have passed through the collimating optical system 114C, at different positions in the direction that the light beams propagate.

Ten light beams Lz are emitted from the semiconductor lasers of the laser block 114B in the +Z direction. The light beams Lz are collimated by the collimating optical system 114C so that the optical axes thereof become parallel, and the slow axes thereof become coplanar. The ten collimated light beams Lz further propagate in the +Z direction. Five light beams Lz1 from among the ten collimated light beams Lz pass through the prisms 114p1 of the light beam rearrangement optical system 114R. The light beams Lz1 pass through the three triangular prism portions Pt of the prisms 114p1, shown in FIG. 3 or FIG. 11, and are rearranged such that the fast axes thereof become parallel and coplanar.

On the other hand, the five light beams Lz2, other than the five light beams Lz1, which are emitted from the collimating optical system 114C in the +Z direction, pass through the prisms 114p2 of the light beam rearrangement optical system 114R. The light beams Lz2 are rearranged such that the fast axes thereof become parallel and coplanar, and are emitted toward the −Y direction.

That is, each light beam Lz2, which propagates in the +Z direction, enters a first triangular prism portion Pt of the prism 114p2. The first triangular prism portion Pt reflects the light beam Lz2 toward the +X direction. The light beam Lz2 passes through the quadratic prism-shaped transmitting portion Ps and enters a second triangular prism portion Pt. The second triangular prism portion Pt reflects the light beam Lz2 toward the −Y direction. The light beam Lz2, which is emitted from the prism 114p2 toward the −Y direction, enters a triangular prism portion Pt of the prism 114p1 other than the three triangular prism portions shown in FIG. 3 and FIG. 11. The light beam Lz2 is reflected by the triangular prism portion Pt toward the +Z direction.

As shown in FIG. 16, the light beams Lz1 and Lz2, which are emitted toward the +Z direction, have different positions in the X direction.

Rearrangement of the light beams is realized without interference between adjacent light beams, and a bundle of light beams, which are close to each other (i.e., realize high space utilization efficiency), is generated.

The rearranged light beams Lz1 and Lz2 are emitted from the light beam rearrangement optical system 114R as a bundle (refer to FIG. 27C). The bundle of light beams is converged in the YZ plane by the F convergence lens 114Ff so that the width thereof in the direction of the fast axes is reduced. Then, the bundle of light beams is converged in the XZ plane by the S convergence lens 114Fs so that the width thereof in the direction of the slow axes is reduced. Thereafter, the converged bundle of light beams enters the core of the optical fiber 114L.

Here, the spot of the bundle of light, which is converged on the end face of the 60 μm diameter core of the optical fiber 114L, is 5 μm long in the direction of the fast axes and 60 μm long in the direction of the slow axes. Note that the above is a rough calculation based only on the magnification rate of the optical systems, which does not take into account blur due to diffraction. In this manner, the light beams emitted from the semiconductor lasers are capable of being converged with higher quality in the direction of the fast axes than in the direction of the slow axes. Therefore, the bundle of light beams Lz1 and Lz2 is capable of being coupled to the optical fiber 114L at a high coupling efficiency, for example, at a coupling efficiency of 90%.

Embodiment Ex5

Figure 18A:
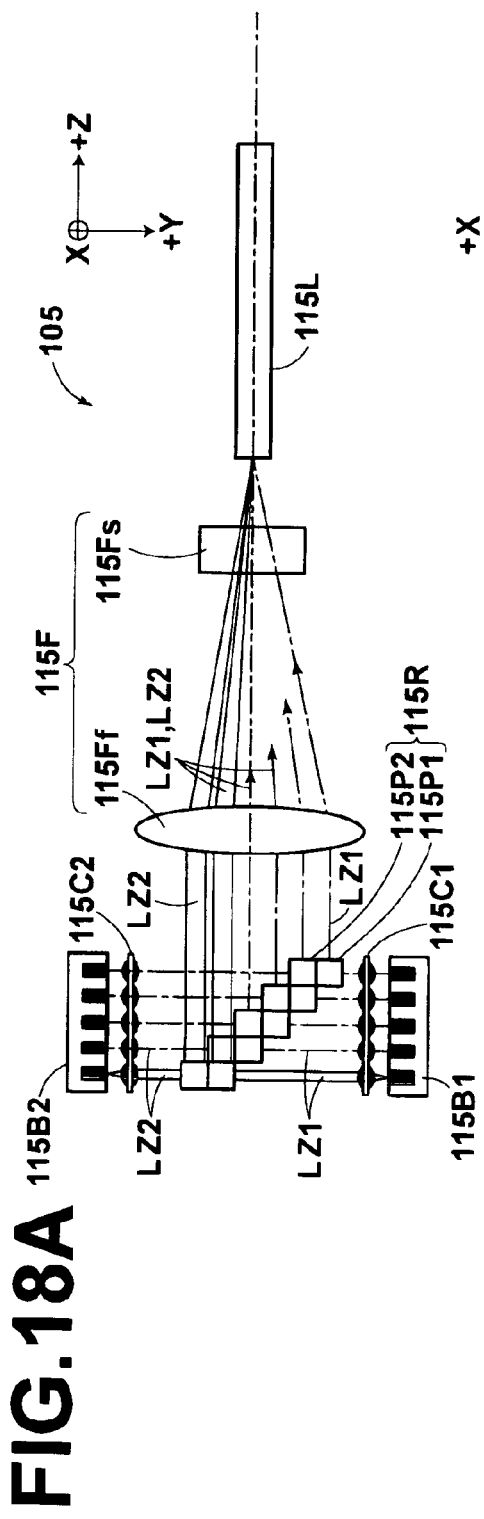
FIGS. 18A, 18B and 18C are schematic views illustrating the construction of a laser light multiplexing apparatus according to Embodiment Ex5.
Figure 18B:
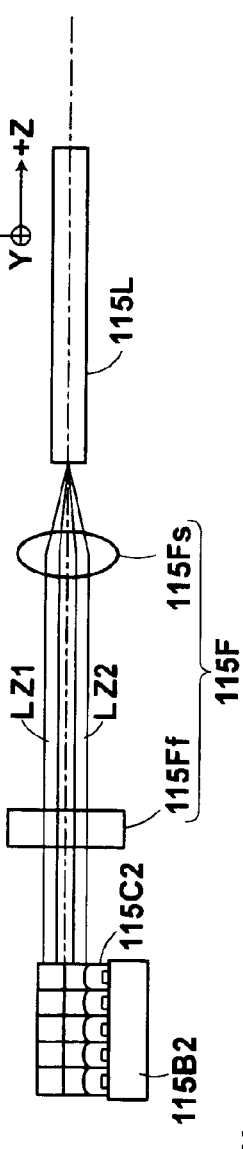
Figure 18C:
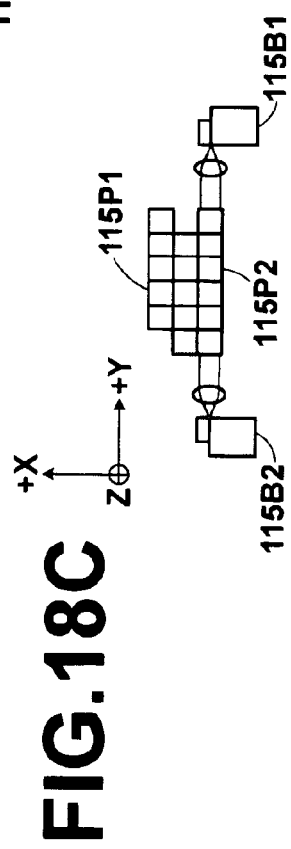
Figure 19:
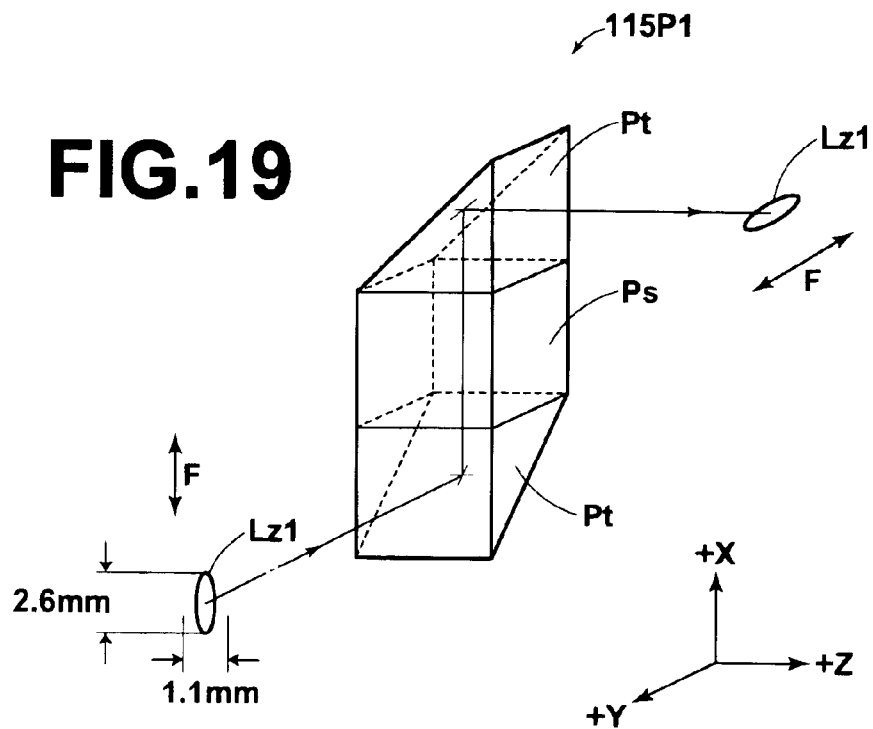
FIG. 19 is an enlarged perspective view of a prism which is utilized in the light beam rearrangement optical system.
Figure 20:
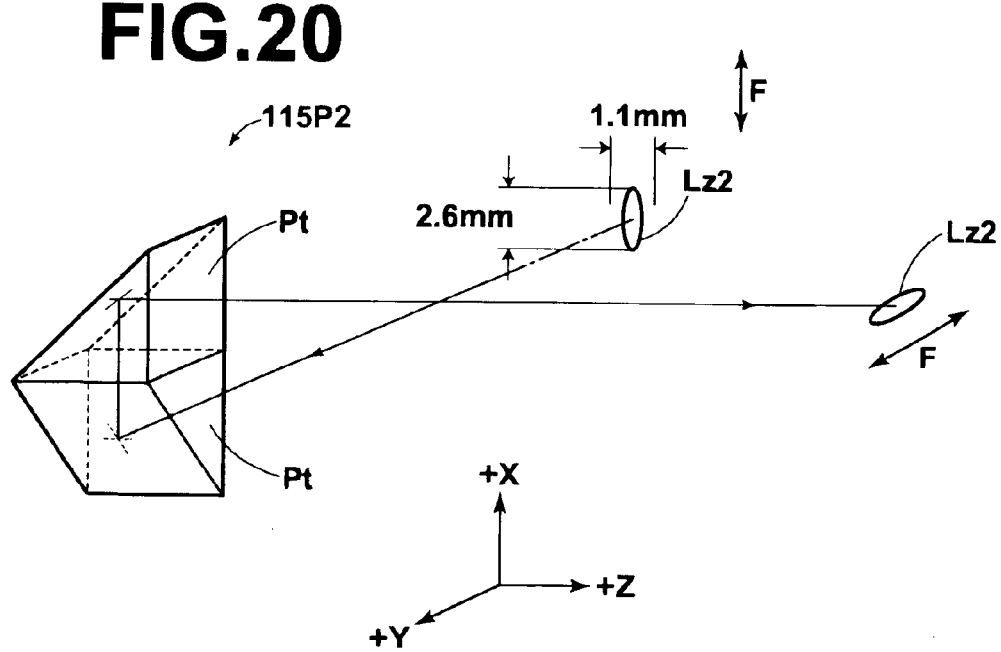
FIG. 20 is an enlarged perspective view of a prism which is utilized in the light beam rearrangement optical system.

FIGS. 18A, 18B and 18C are schematic views illustrating the construction of a laser light multiplexing apparatus 105 according to Embodiment Ex5. FIG. 18A is a plan view of the laser light multiplexing apparatus 105. FIG. 18B is a front view of the laser multiplexing apparatus 105. FIG. 18C is a left side view of the laser light multiplexing apparatus 105. FIG. 19 is a perspective view of a first prism which is utilized in the light beam rearrangement optical system. FIG. 20 is a perspective view of a second prism which is utilized in the light beam rearrangement optical system.

The laser light multiplexing apparatus 105 of embodiment Ex5 comprises: a first laser block 115B1 and a second laser block 115B2 that face each other, on each of which five semiconductor lasers are provided; a first collimating optical system 115C1 and a second collimating optical system 115C2 provided corresponding to the laser blocks 115B1 and 115B2, respectively; the light beam rearrangement optical system 115R for rearranging light beams which have passed through the collimating optical systems 115C1 and 115C2; the convergence optical system 115F; and the optical fiber 115L. Note that the first laser block 115B1 emits light beams in the −Y direction, and the second laser block 115B2 emits light beams in the +Y direction.

Note that as described above, the emission width Ds in the direction of the slow axes, of the light beams emitted from the five semiconductor lasers provided on the laser blocks 115B1 and 115B2, is 30 $\mu$m. The focal distance of the convergence optical system 115F is 30 mm in the direction of the fast axes and 5.9 mm in the direction of the slow axes. The core diameter of the optical fiber 115L is 60 $\mu$m.

The light beam rearrangement optical system 115R comprises five prisms 115p1 and five prisms 115p2, illustrated in FIG. 19 and FIG. 20, respectively. Each prism 115p1 is a combination of a quadratic prism-shaped transmitting portion Ps and two triangular prism portions Pt provided so as to sandwich the quadratic prism-shaped transmitting portion Ps therebetween. Each prism 115p2 is a combination of two triangular prism portions Pt.

The five prisms 115p1 are respectively provided corresponding to five light beams, which have been emitted from the laser block 115B1 and have passed through the collimating optical system 115C1, at different positions in the direction that the light beams propagate. The five prisms 115p2 are respectively provided corresponding to five light beams, which have been emitted from the laser block 115B2 and have passed through the collimating optical system 115C2, at different positions in the direction that the light beams propagate.

Five light beams Lz1 are emitted from the semiconductor lasers of the laser block 115B1 in the −Y direction. The light beams Lz1 are collimated by the collimating optical system 115C1 so that the optical axes thereof become parallel, and the slow axes thereof become coplanar. The five collimated light beams Lz1 further propagate in the −Y direction, and enter the prisms 115p1 of the light beam rearrangement optical system 115R. The light beams Lz1 that enter the prisms 115p1 are reflected twice therein, are rearranged such that the fast axes thereof become parallel and coplanar, and are emitted toward the +Z direction.

That is, each of the light beams Lz1, which propagate in the −Y direction, enters a first triangular prism portion Pt of the prism 115p1. The first triangular prism portion Pt reflects the light beam Lz1 toward the +X direction. The light beam Lz1 passes through the quadratic prism-shaped transmitting portion Ps and enters a second triangular prism portion Pt. The second triangular prism portion Pt reflects the light beam Lz1 toward the +Z direction.

On the other hand, five light beams Lz2 are emitted from the semiconductor lasers of the laser block 115B2 in the +Y direction. The light beams Lz2 are collimated by the collimating optical system 115C2 so that the optical axes thereof become parallel, and the slow axes thereof become coplanar. The five collimated light beams Lz2 further propagate in the +Y direction, and enter the prisms 115p2 of the light beam rearrangement optical system 115R. The light beams Lz2 that enter the prisms 115p2 are reflected twice therein, are rearranged such that the fast axes thereof become parallel and coplanar, and are emitted toward the +Z direction.

That is, each of the light beams Lz2, which propagate in the +Y direction, enters a first triangular prism portion Pt of the prism 115p1. The first triangular prism portion Pt reflects the light beam Lz2 toward the +X direction. The reflected light beam Lz2 enters a second triangular prism portion Pt. The second triangular prism portion Pt reflects the light beam Lz2 toward the +Z direction.

As shown in FIG. 27D, the light beams Lz1 and Lz2, which are emitted toward the +Z direction, have different positions in the X direction, and are shifted in the Y direction for the space of one light beam.

The rearranged light beams Lz1 and Lz2 are respectively emitted from the prisms 115p1 and 115p2 as a bundle. The bundle of light beams is converged in the YZ plane by the F convergence lens 115Ff so that the width thereof in the direction of the fast axes is reduced. Then, the bundle of light beams is converged in the XZ plane by the S convergence lens 115Fs so that the width thereof in the direction of the slow axes is reduced. Thereafter, the converged bundle of light beams enters the core of the optical fiber 115L.

Here, the spot of the bundle of light, which is converged on the end face of the 60 $\mu$m diameter core of the optical fiber 115L, is 5 $\mu$m long in the direction of the fast axes and 60 $\mu$m long in the direction of the slow axes. Note that the above is a rough calculation based only on the magnification rate of the optical systems, which does not take into account blur due to diffraction. In this manner, the light beams emitted from the semiconductor lasers are capable of being converged with higher quality in the direction of the fast axes than in the direction of the slow axes. Therefore, the bundle of light beams Lz1 and Lz2 is capable of being coupled to the optical fiber 115L at a high coupling efficiency, for example, at a coupling efficiency of 90%.

Embodiment Ex6

FIGS. 21A and 21B are schematic views illustrating the construction of a laser light multiplexing apparatus 106 according to embodiment Ex6. FIG. 21A is a plan view of the laser light multiplexing apparatus 106. FIG. 21B is a front view of the laser light multiplexing apparatus 106.

The laser light multiplexing apparatus 106 of embodiment Ex6 comprises: a main optical system 116M, which has the same components and functions as that of the laser light multiplexing apparatus 101 of embodiment Ex1; and a sub optical system 116S.

The sub optical system 116S comprises: additional semiconductor lasers different from the semiconductor lasers of the main optical system 116M; and a polarization multiplexing means, provided within the optical path of light beams emitted by the semiconductor lasers of the main optical system 116M, for polarization multiplexing the light beams emitted by the additional semiconductor lasers. The light beams emitted from the additional lasers of the sub optical system 116S are also multiplexed and caused to enter the optical fiber of the main optical system 116M.

The main optical system 116M comprises a laser block 116B1, on which five semiconductor lasers that emit light beams in the +Z direction are provided, as the laser block 116B; a collimating optical system 116C1 as the collimating optical system 116C; a light beam rearrangement optical system 116R1 as the light beam rearrangement optical system 116R; the convergence optical system 116F, and the optical fiber 116L.

Note that the laser block 116B1, the collimating optical system 116C1, the light beam rearrangement optical system 116R1, the convergence optical system 116F, and the optical fiber 116L of the main optical system 116M correspond to the laser block 111B, the collimating optical system 111C, the light beam rearrangement optical system 111R, the convergence optical system 111F and the optical fiber 111L of the laser light multiplexing apparatus 101 of embodiment Ex1.

The sub optical system 116S comprises a laser block 116B2, on which five semiconductor lasers that emit light beams in the −Y direction are provided, as the laser block 116B; a collimating optical system 116C2 as the collimating optical system 116C; a light beam rearrangement optical system 116R2 as the light beam rearrangement optical system 116R; a ½λ wavelength plate 116λ; and a polarizing beam splitter 116P.

The collimating optical system 116C2, the light beam rearrangement optical system 116R2, the ½λ wavelength plate 116λ, and the polarizing beam splitter 116P constitute a polarization multiplexing means 116G. The polarization multiplexing means 116G multiplexes each of the five light beams emitted by the semiconductor lasers of the laser block 116B2 with the light beams of the main optical system 116M, emitted by the laser block 116B1, to enter the optical fiber 116L.

Here, the polarizing beam splitter 116P of the polarization multiplexing means 116G is provided between the light beam rearrangement optical system 116R1 of the main optical system 116M and the convergence optical system 116F.

Note that as described above, the emission width Ds in the direction of the slow axes, of the light beams emitted from the ten semiconductor lasers provided on the laser block 116B1 and 116B2, is 50 μm. The focal distance of the convergence optical system 117F is 30 mm in the direction of the fast axes and 2.85 mm in the direction of the slow axes. The core diameter of the optical fiber 117L is 60 μm.

The light beam rearrangement optical systems 116R1 and 116R2, are of the same construction as the light beam rearrangement optical system 111R of embodiment Ex1. A prism, which is the same as that shown in FIG. 11, is provided corresponding to each of the five light beams of the main optical system 116M and the sub optical system 116S, at. different positions in the direction that the light beams propagate.

Next, the manner in which light beams Lz2, which propagate through the sub optical system 116S, are multiplexed into the optical paths of light beams Lz1, which propagate through the main optical system 116M, will be described.

Five light beams Lz1 are emitted from the semiconductor lasers of the laser block 116B1 in the +Z direction. The light beams Lz1 are collimated by the collimating optical system 116C1 so that the optical axes thereof become parallel, and the slow axes thereof become coplanar. The five collimated light beams Lz1 further propagate in the +Z direction, and enter the prisms of the light beam rearrangement optical system 116R1. The light beams Lz1 are rearranged by the light beam rearrangement optical system 116R1 such that the fast axes thereof become parallel and coplanar, and are emitted toward the +Z direction. Here, rearrangement of the light beams is realized without interference between adjacent light beams, and a bundle of light beams, which are close to each other (i.e., realize high space utilization efficiency), is generated.

The light beams Lz1, which propagate in the +Z direction to enter the light beam rearrangement optical system 116R1, are emitted from the light beam rearrangement optical system 116R1 toward the +Z direction. The light beams Lz1 then enter the polarizing beam splitter 116P, pass through a beam splitting surface BS1, and are emitted from the polarizing beam splitter 116P toward the +Z direction.

The light beams Lz1, which have been rearranged so that the fast axes thereof are parallel and coplanar, are emitted from the polarizing beam splitter 116P as a bundle. The bundle of light beams is converged in the YZ plane by the F convergence lens 116Ff so that the width thereof in the direction of the fast axes is reduced. Then, the bundle of light beams is converged in the XZ plane by the S convergence lens 116Fs so that the width thereof in the direction of the slow axes is reduced. Thereafter, the converged bundle of light beams enters the core of the optical fiber 115L.

Meanwhile, five light beams Lz2 are emitted in the +Y direction from the semiconductor lasers of the laser block 116B2 of the sub optical system 116S. The light beams Lz2 are collimated by the collimating optical system 116C2 so that the optical axes thereof become parallel, and the slow axes thereof become coplanar. The five collimated light beams Lz2 further propagate in the +Y direction, and enter the prisms of the light beam rearrangement optical system 116R2. The light beams Lz2 are rearranged by the light beam rearrangement optical system 116R2 such that the fast axes thereof become parallel and coplanar. Here, rearrangement of the light beams is realized without interference between adjacent light beams, and a bundle of light beams, which are close to each other (i.e., realize high space utilization efficiency), is generated.

The light beams Lz2, which are emitted from the light beam rearrangement optical system 116R2 toward the +Y direction, pass through the ½λ wavelength plate 116λ. The ½λ wavelength plate 116λ rotates the polarization direction of the light beams Lz2 by 90°, then emits them toward the +Y direction.

Note that the sub optical system 116S is constructed so that the optical axes of the light beams Lz2, which have passed through the ½λ wavelength plate 116λ, are coplanar with and perpendicular to the optical axes of the light beams Lz2, which have been rearranged by the light beam rearrangement optical system 116R2.

The light beams Lz2, which have been emitted from the ½λ wavelength plate 116λ toward the +Y direction, enter the polarizing beam splitter 116P and are reflected by the beam splitting surface BS1 toward the +Z direction. Then, each of the light beams Lz2, which have been reflected by the polarizing beam splitter 116P and propagate in the +Z direction, enter the optical fiber 116L via the same optical paths as those of the light beams Lz1, which have been emitted from the laser block 116B1 and propagate in the +Z direction. Note that the polarization directions, of the light beams Lz1 and Lz2 emitted from the polarizing beam splitter 116P, are shifted by 90°.

Here, the spot of the bundle of light, which is converged on the end face of the 60 μm diameter core of the optical fiber 116L, is 5 μm long in the direction of the fast axes and 50 μm long in the direction of the slow axes. Note that the above is a rough calculation based only on the magnification rate of the optical systems, which does not take into account blur due to diffraction. In this manner, the light beams emitted from the semiconductor lasers are capable of being converged with higher quality in the direction of the fast axes than in the direction of the slow axes. Therefore, the bundle of light beams Lz1 and Lz2 is capable of being coupled to the optical fiber 116L at a high coupling efficiency, for example, at a coupling efficiency of 90%.

Embodiment Ex7

Figure 23A:
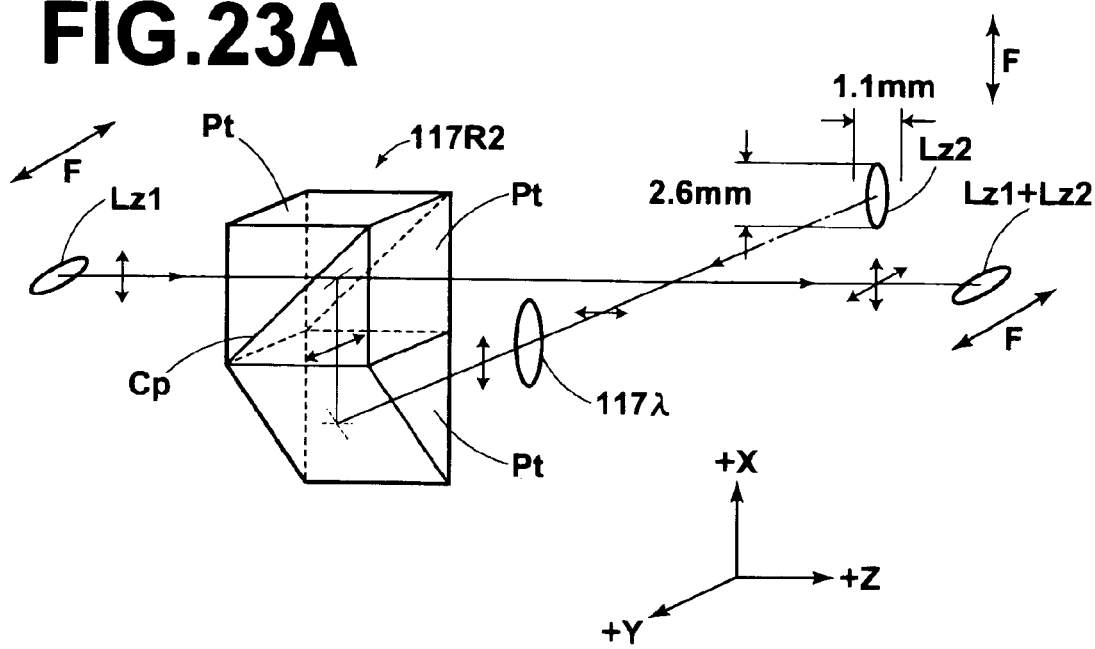
FIGS. 23A and 23B illustrate the manner in which a light beam passes through a prism, which is utilized in the light beam rearrangement optical system.
Figure 23B:
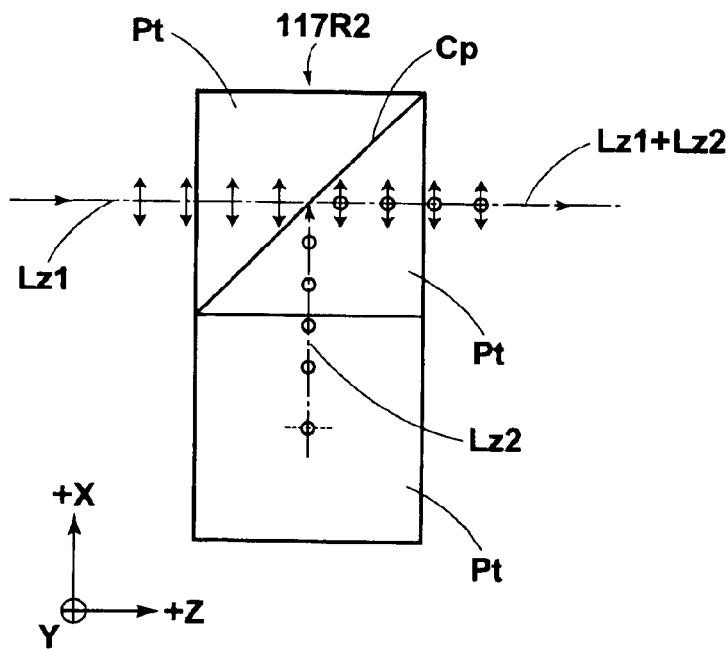

FIGS. 22A and 22B are schematic views illustrating the construction of a laser light multiplexing apparatus 107 according to embodiment Ex7. FIG. 22A is a plan view of the laser light multiplexing apparatus 107. FIG. 22B is a front view of the laser light multiplexing apparatus 107. FIGS. 23A and 23B are magnified views of a light beam rearrangement optical system of the laser light multiplexing apparatus 107. FIG. 23A is a perspective view of a prism which is employed in the light beam rearrangement optical system. FIG. 23B illustrates the manner in which light beams that enter the prism from different directions are polarization multiplexed.

The laser light multiplexing apparatus 107 of embodiment Ex7 comprises: a main optical system 117M, which has the same components and functions as the main optical system 116M of the laser light multiplexing apparatus 106 of embodiment Ex6; and a sub optical system 117S, which has the same components and functions as the sub optical system 116S of embodiment Ex6. Light beams emitted from the semiconductor lasers of the sub optical system 117S are also multiplexed and caused to enter the optical fiber of the main optical system 117M. Descriptions of components and functions in common with those of the laser light multiplexing apparatus 106 of embodiment Ex6 will be omitted.

The sub optical system 117S comprises a laser block 117B2, on which five semiconductor lasers that emit light beams in the +Y direction are provided, as the laser block 117B; a collimating optical system 117C2 as the collimating optical system 116C; a ½λ wavelength plate 117λ; and a light beam rearrangement optical system 117R2 that also performs the functions of a polarizing beam splitter.

The collimating optical system 117C2, the ½λ wavelength plate 117λ, and the light beam rearrangement optical system 117R2 constitute a polarization multiplexing means 117G. The polarization multiplexing means 117G multiplexes each of the five light beams emitted by the semiconductor lasers of the laser block 117B2 with the light beams of the main optical system 117M, emitted by the laser block 117B1, to enter the optical fiber 117L.

Here, the light beam rearrangement optical system 117R2 is provided between the light beam rearrangement optical system 117R1 of the main optical system 117M and the convergence optical system 117F.

Note that the emission width Ds in the direction of the slow axes, of the light beams emitted from the ten semiconductor lasers provided on the laser blocks 117B1 and 117B2, is 50 μm. The focal distance of the convergence optical system 117F is 30 mm in the direction of the fast axes and 2.85 mm in the direction of the slow axes. The core diameter of the optical fiber 117L is 60 λm.

The light beam rearrangement optical system 117R2 comprises five prisms 117p, as illustrated in FIG. 23A and FIG. 23B. Each prism 117p is a combination of a polarization coating film Cp for polarization multiplexing and three triangular prism portions Pt. That is, each prism 117p of the light beam rearrangement optical system 117R2 comprises: beam splitter portions formed by the polarization coating films Cp, which is applied between two triangular prism portions Pt; and a triangular prism portion Pt that leads a light beam, to be polarization multiplexed, to the beam splitter portion.

Light beams Lz1 are emitted from the semiconductor lasers of the laser block 117B1 in the +Z direction. The light beams Lz1 are rearranged by the light beam rearrangement optical system 117R1 of the main optical system 117M and emitted therefrom toward the +Z direction. Then, the light beams Lz1 pass through the beam splitter portion of the light beam rearrangement optical system 117R2 and are emitted therefrom toward the +Z direction. Meanwhile, light beams Lz2 are emitted from the semiconductor lasers of the laser block 117B2 in the +Y direction. The light beams Lz2 pass through the ½λ wavelength plate 117λ and continue to propagate in the +Y direction. Then, the light beams Lz2 enter the triangular prism portion Pt of the prism 117p and is reflected toward the +X direction thereby. The light beams Lz2 enter the beam splitter portion and are reflected toward the +Z direction by the polarization coating film Cp. Thereby, the light beams Lz2 are multiplexed into the optical paths of the light beams Lz1, within the main optical system 117M.

In this manner, the light beams Lz2, which propagate through the sub optical system 117S, are multiplexed into the optical paths of the light beams Lz1, which propagate through the main optical system 117M. A bundle of the multiplexed light beams Lz1 and Lz2 (refer to FIG. 27A) passes through the convergence optical system 117F and enters the core of the optical fiber 117L.

Here, the spot of the bundle of light, which is converged on the end face of the 60 μm diameter core of the optical fiber 117L, is 5 μm long in the direction of the fast axes and 50 μm long in the direction of the slow axes. Note that the above is a rough calculation based only on the magnification rate of the optical systems, which does not take into account blur due to diffraction. In this manner, the light beams emitted from the semiconductor lasers are capable of being converged with higher quality in the direction of the fast axes than in the direction of the slow axes. Therefore, the bundle of light beams Lz1 and Lz2 is capable of being coupled to the optical fiber 117L at a high coupling efficiency, for example, at a coupling efficiency of 90%.

Embodiment Ex8

FIGS. 24A and 24B are schematic views illustrating the construction of a laser light multiplexing apparatus 108 according to embodiment Ex8. FIG. 24A is a plan view of the laser light multiplexing apparatus 108. FIG. 24B is a front view of the laser light multiplexing apparatus 108.

The laser light multiplexing apparatus 108 of embodiment Ex8 comprises: a main optical system 118M, which has the same components and functions as the main optical system 116M of the laser light multiplexing apparatus 106 of embodiment Ex6; and a sub optical system 118S.

The sub optical system 118S comprises: additional semiconductor lasers different from the semiconductor lasers of the main optical system 118M; and a wavelength multiplexing means, provided within the optical path of light beams emitted by the semiconductor lasers of the main optical system 118M, for wavelength multiplexing the light beams emitted by the additional semiconductor lasers. The light beams emitted from the additional lasers of the sub optical system 118S are also multiplexed and caused to enter the optical fiber of the main optical system 118M. Note that descriptions of components and function in common with the laser light multiplexing apparatus 106 of embodiment Ex6 will be omitted.

The sub optical system 118S further comprises: a first multiplexing portion, for multiplexing light beams Lz2 having wavelengths of 370 nm with light beams Lz1 having wavelengths of 410 nm, which propagate through the main optical system 118M; and a second multiplexing portion, for multiplexing light beams Lz3 having wavelengths of 450 nm with the light beams Lz2 having wavelengths of 370 nm.

The first multiplexing portion comprises a laser block 118B2, on which five semiconductor lasers that emit light beams having wavelengths of 370 nm are provided; a collimating optical system 118C2 for collimating the light beams Lz2 emitted from the laser block 118B2; a light beam rearrangement optical system 118R2 for rearranging the light beams Lz2 which have passed through the collimating optical system 118C2; and a dichroic beam splitter 118D2, which transmits light having wavelengths of 410 nm and reflects light having wavelengths of 370 nm.

The collimating optical system 118C2, the light beam rearrangement optical system 118R2, and the dichroic beam splitter 118D2 constitute a wavelength multiplexing means 118G2. The wavelength multiplexing means 118G2 multiplexes each of the five light beams Lz2, which have been emitted from the laser block 118B2, with light beams Lz1, which have been emitted form the laser block 118B1 and enter the optical fiber 118L of the main optical system 118M.

A collimating optical system 118C3, a light beam rearrangement optical system 118R3, and a dichroic beam splitter 118D3 constitute a wavelength multiplexing means 118G3. The wavelength multiplexing means 118G3 multiplexes each of the five light beams Lz3, which have been emitted from a laser block 118B3, with light beams Lz1, which have been emitted form the laser block 118B1 and enter the optical fiber 118L of the main optical system 118M.

Here, the laser blocks 118B2 and 118B3 of the sub optical system 118S are provided between the light beam rearrangement optical system 118R1 of the main optical system 118M and the convergence optical system 118F.

Note that the emission width Ds in the direction of the slow axes, of the light beams emitted from the ten semiconductor lasers provided on the laser blocks 118B1, 118B2, and 118B3, is 50 μm. The focal distance of the convergence optical system 118F is 30 mm in the direction of the fast axes and 2.85 mm in the direction of the slow axes. The core diameter of the optical fiber 118L is 60 μm.

The light beam rearrangement optical systems 118R2 and 118R3 are the same as the light beam rearrangement optical system 118R1, which is the same as the light beam rearrangement optical system 111R of embodiment Ex1. The light beam rearrangement optical systems 118R1, 118R2, and 118R3 each comprise five prisms, which are the same as that which is illustrated in FIG. 11. Each of the five prisms is provided corresponding to each of the five light beams emitted from the laser blocks 118B1, 118B2, and 118B3, at different positions in the direction that the light beams propagate.

Next, the manner in which the light beams Lz2, which propagate through the first multiplexing portion of the sub optical system 118S, and the light beams Lz3, which propagate through the second multiplexing portion of the sub optical system 118S, are multiplexed into the optical paths of light beams Lz1, which propagate through the main optical system 118M, will be described.

Light beams Lz1 are emitted from the semiconductor lasers of the laser block 118B1 in the +Z direction. The light beams Lz1 are collimated by the collimating optical system 118C1 such that the optical axes thereof become parallel, and the slow axes thereof become coplanar. Then, the collimated light beams Lz1 pass through the prisms of the light beam rearrangement optical system 118R1, so that the fast axes thereof become parallel and coplanar, and emitted therefrom toward the +Z direction. Here, it is possible to perform rearrangement of the light beams without interference between adjacent light beams, and to generate a bundle formed by light beams which are close to each other (i.e., realize high space utilization efficiency).

The light beams Lz1, which are emitted toward the +Z direction from the light beam rearrangement optical system 118R1, pass through a dichroic surface DC2 of the dichroic beam splitter 118D2 and are emitted therefrom. Then, the light beams Lz1 pass through a dichroic surface DC3 of a dichroic beam splitter 118D3 and are emitted therefrom. Thereafter, the bundle of light beams Lz1, which have wavelengths of 410 nm, enters the convergence optical system 118F. The bundle of light beams is converged in the YZ plane by the F convergence lens 118Ff so that the width thereof in the direction of the fast axes is reduced. Then, the bundle of light beams is converged in the XZ plane by the S convergence lens 118Fs so that the width thereof in the direction of the slow axes is reduced. Finally, the converged bundle of light beams enters the core of the optical fiber 118L.

Meanwhile, five light beams Lz2 having wavelengths of 370 nm are emitted from the five semiconductor lasers of the laser block 118B2 in the sub optical system 118S. The light beams Lz2 are collimated by the collimating optical system 118C2 such that the optical axes thereof become parallel, and the slow axes thereof become coplanar. Then, the collimated light beams Lz2 pass through the prisms of the light beam rearrangement optical system 118R2, so that the fast axes thereof become parallel and coplanar, and emitted therefrom toward the +Y direction.

Note that the first multiplexing portion of the sub optical system 118S is constructed so that the optical axes of the light beams Lz2, which are emitted from the light beam rearrangement optical system 118R2, are coplanar with and perpendicular to the optical axes of the light beams Lz1, which have been rearranged by the light beam rearrangement optical system 118R1.

The light beams Lz2, which have been emitted from the light beam rearrangement optical system 118R2 toward the +Y direction, enter the dichroic beam splitter 118D2 and are reflected by the dichroic surface DC2 toward the +Z direction. Then, each of the light beams Lz2, which have been reflected by the dichroic surface DC2 and propagate in the +Z direction, enter the dichroic beam splitter 118D3 via the same optical paths as those of the light beams Lx1. Finally, the light beams Lz2 pass through the convergence optical system 118F and enter the optical fiber 118L.

Five light beams Lz3 having wavelengths 450 nm are emitted from the five semiconductor lasers of the laser block 118B3 toward the +Y direction. The light beams Lz3 pass through the collimating optical system 118C3, are rearranged bye the light beam rearrangement optical system 118R3, and are emitted toward the +Y direction therefrom in the same manner as the light beams Lz2 described above.

Note that the second multiplexing portion of the sub optical system 118S is constructed so that the optical axes of the light beams Lz3, which are emitted from the light beam rearrangement optical system 118R3, are coplanar with and perpendicular to the optical axes of the light beams Lz1, which have been rearranged by the light beam rearrangement optical system 118R1.

The light beams Lz3, which have been emitted from the light beam rearrangement optical system 118R3 toward the +Y direction, enter the dichroic beam splitter 118D3 and are reflected by the dichroic surface DC3. Then, each of the light beams Lz3, which have been reflected by the dichroic surface DC3, propagate via the same optical paths as those of the light beams Lz1 and Lz2 (refer to FIG. 27A). Finally, the light beams Lz3 are converged by the convergence optical system 118F and enter the optical fiber 118L.

Here, the spot of the bundle of light, which is converged on the end face of the 60 μm diameter core of the optical fiber 117L, is 5 μm long in the direction of the fast axes and 50 μm long in the direction of the slow axes. Note that the above is a rough calculation based only on the magnification rate of the optical systems, which does not take into account blur due to diffraction. In this manner, the light beams emitted from the semiconductor lasers are capable of being converged with higher quality in the direction of the fast axes than in the direction of the slow axes. Therefore, the bundle of light beams Lz1, Lz2, and Lz3 is capable of being coupled to the optical fiber 118L at a high coupling efficiency, for example, at a coupling efficiency of 90%.

Embodiment Ex9

Figure 26A:
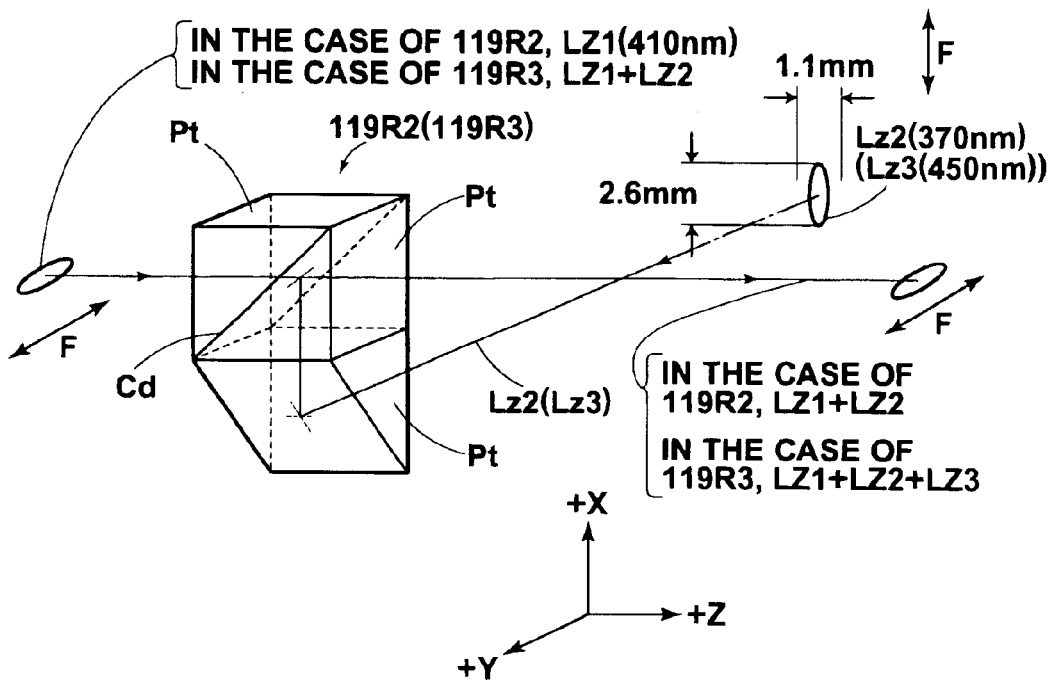
FIGS. 26A and 26B illustrate the manner in which a light beam passes through a prism, which is utilized in the light beam rearrangement optical system.
Figure 26B:
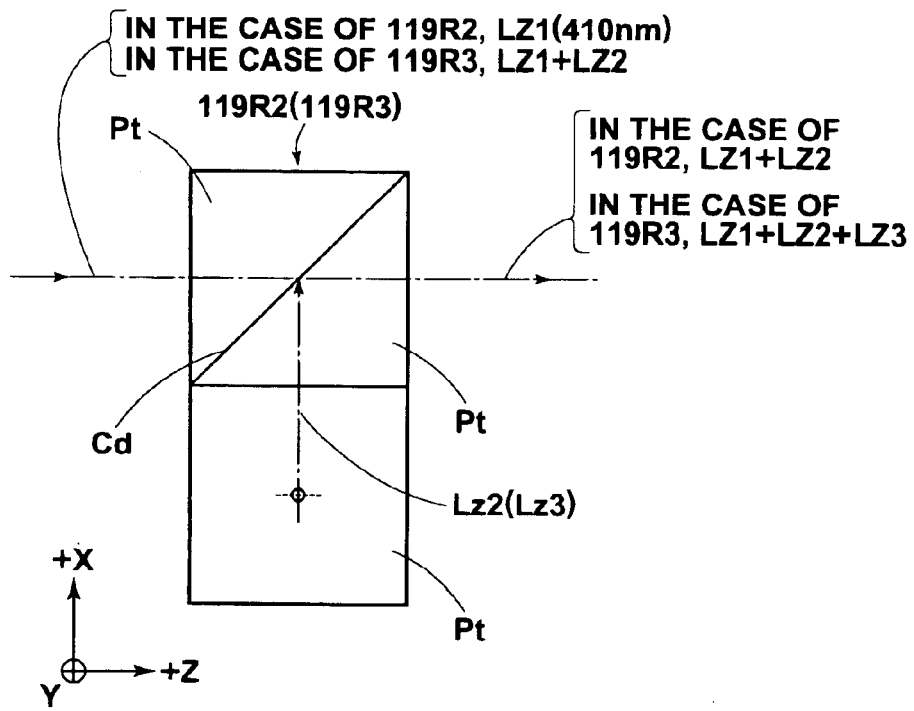

FIGS. 25A and 25B are schematic views illustrating the construction of a laser light multiplexing apparatus 109 according to embodiment Ex9. FIG. 25A is a plan view of the laser light multiplexing apparatus 109. FIGS. 26A and 26B are magnified views of a light beam rearrangement optical system of the laser light multiplexing apparatus 109. FIG. 26A is a perspective view of a prism which is employed in the light beam rearrangement optical system. FIG. 26B illustrates the manner in which light beams that enter the prism from different directions are wavelength multiplexed.

The laser light multiplexing apparatus 109 of embodiment Ex9 comprises: a main optical system 119M, which has the same components and functions as the main optical system 118M of the laser light multiplexing apparatus 108 of embodiment Ex8; and a sub optical system 119S, which has the same components and functions as the sub optical system 118S of embodiment Ex8. Light beams emitted from the semiconductor lasers of the sub optical system 119S are also multiplexed and caused to enter the optical fiber of the main optical system 119M. Descriptions of components and functions in common with those of the laser light multiplexing apparatus 108 of embodiment Ex8 will be omitted.

A first multiplexing portion of the sub optical system 119S comprises a laser block 119B2, on which five semiconductor lasers that emit light beams in the +Y direction are provided; a collimating optical system 119C2; and a light beam rearrangement optical system 119R2 that also performs the functions of a dichroic beam splitter that transmits light having wavelengths of 410 nm and reflects light having wavelengths of 370 nm.

The collimating optical system 119C2 and the light beam rearrangement optical system 119R2 constitute a wavelength multiplexing means 119G2. The wavelength multiplexing means 119G2 multiplexes each of the five light beams emitted by the semiconductor lasers of the laser block 119B2 with the light beams of the main optical system 119M, emitted by the laser block 119B1, to enter the optical fiber 119L.

Here, the light beam rearrangement optical system 119R2 and a light beam rearrangement optical system 119R3 (to be described later) are provided between the light beam rearrangement optical system 119R1 of the main optical system 119M and the convergence optical system 119F.

Note that the emission width Ds in the direction of the slow axes, of the light beams emitted from the five semiconductor lasers provided on each of the laser blocks 119B1, 119B2, and 119B3 (to be described later) is 50 $\mu$m. The focal distance of the convergence optical system 119F is 30 mm in the direction of the fast axes and 2.85 mm in the direction of the slow axes. The core diameter of the optical fiber 119L is 60 $\mu$m.

The light beam rearrangement optical system 119R2 of the sub optical system 119S comprises five prisms 119p, as illustrated in FIG. 26A and FIG. 26B. Each prism 119p is a combination of a dichroic coating film Cd for wavelength multiplexing and three triangular prism portions Pt. That is, each prism 119p of the light beam rearrangement optical system 119R2 comprises: dichroic beam splitter portions formed by the dichroic coating film Cd, which is applied between two triangular prism portions Pt; and a triangular prism portion Pt that leads a light beam, to be wavelength multiplexed, to the dichroic beam splitter portion.

Light beams Lz1 are emitted from the semiconductor lasers of the laser block 119B1 in the +Z direction. The light beams Lz1 are rearranged by the light beam rearrangement optical system 119R1 of the main optical system 119M and emitted therefrom toward the +Z direction. Then, the light beams Lz1 are transmitted through the dichroic beam splitter portion of the light beam rearrangement optical system 119R2 and are emitted therefrom toward the +Z direction. Meanwhile, light beams Lz2 are emitted from the semiconductor lasers of the laser block 119B2 in the +Y direction. The light beams Lz2 are collimated by the collimating optical system 119C2 of the first multiplexing portion and continue to propagate in the +Y direction. Then, the light beams Lz2 enter the triangular prism portion Pt of the prism 119p and is reflected toward the +X direction thereby. The light beams Lz2 enter the dichroic beam splitter portion and are reflected toward the +Z direction by the polarization coating film Cp. Thereby, the light beams Lz2 are multiplexed into the optical paths of the light beams Lz1, within the main optical system 119M.

In this manner, the light beams Lz2, which propagate through the sub optical system 119S, are multiplexed into the optical paths of the light beams Lz1, which propagate through the main optical system 119M.

A second multiplexing portion of the sub optical system 119S comprises a laser block 119B3, on which five semiconductor lasers that emit light beams in the +Y direction are provided; a collimating optical system 119C3; and a light beam rearrangement optical system 119R3 that also performs the functions of a dichroic beam splitter that transmits light having wavelengths of 410 nm and reflects light having wavelengths of 450 nm.

The operation of the second multiplexing portion is the same as that of the first multiplexing portion described above. Light beams Lz3 are emitted by the laser block 119B3. The light beams Lz3 are collimated by the collimating optical system 119C3. The light beams Lz3 are then reflected by the dichroic beam splitter portion of the light beam rearrangement optical system 119R3. Thereby, the light beams Lz3 are multiplexed with the light beams Lz1 and Lz2, which are transmitted through the dichroic beam splitter portion of the light beam rearrangement optical system 119R3 and propagate in the +Y direction.

A bundle of the multiplexed light beams Lz1, Lz2 and Lz3 (refer to FIG. 27A) passes through the convergence optical system 119F and enters the core of the optical fiber 119L.

Here, the spot of the bundle of light, which is converged on the end face of the 60 $\mu$m diameter core of the optical fiber 117L, is 5 $\mu$m long in the direction of the fast axes and 50 $\mu$m long in the direction of the slow axes. Note that the above is a rough calculation based only on the magnification rate of the optical systems, which does not take into account blur due to diffraction. In this manner, the light beams emitted from the semiconductor lasers are capable of being converged with higher quality in the direction of the fast axes than in the direction of the slow axes. Therefore, the bundle of light beams Lz1, Lz2 and Lz3 is capable of being coupled to the optical fiber 119L at a high coupling efficiency, for example, at a coupling efficiency of 90%.

Note that the laser light multiplexing apparatuses described above may be applied to optical fiber lasers comprising stacked lasers (wherein semiconductor lasers are stacked in the direction of the fast axes) such as those disclosed in Japanese Pat. Application Nos. 2002-287640 and 2002-201979. This may be accomplished by optimizing the mounting arrangement of the semiconductor lasers, the collimating functions of the truncated collimating lenses, the light beam rearrangement function of the light beam rearrangement optical system, the converging function of the convergence optical system, and the like.

Note also that the number of light beams to be multiplexed by the laser light multiplexing apparatus of the present invention is not limited to five. Any number of light beams greater than one may be multiplexed.

What is claimed is:

1. A method for optically multiplexing laser light, comprising the steps of:

emitting, from a plurality of semiconductor lasers, light beams having parallel optical axes, coplanar slow axes, and fast axes;

changing the directions of the fast axes of the light beams at different positions along the direction in which the light beams propagate, so that the fast axes of the light beams become coplanar; and converging a bundle of the light beams having the coplanar fast axes in the directions of the fast axes and the slow axes of the light beams, and making the converged bundle of the light beams enter an optical fiber.

2. A laser light multiplexing apparatus comprising:

a laser block on which a plurality of semiconductor lasers each having active layers, which are coplanar with respect to each other, are arranged;

a collimating optical system which collimates the light beams in such a manner that slow axes of the light beams are coplanar, and the optical axes of the light beams are parallel to each other;

a light beam rearrangement optical system, which includes a plurality of prisms respectively arranged corresponding to each of said light beams, for rearranging the light beams in such a manner that directions of the fast axes of the light beams are changed at different locations along the direction in which the light beams propagate, and the fast axes of the light beams become coplanar; and a convergence optical system which converges a bundle of the light beams rearranged by the light beam rearrangement optical system, in directions of the fast axes and the slow axes of the light beams, and makes the converged bundle of the light beams enter an optical fiber.

3. A laser light multiplexing apparatus according to claim 2, wherein said collimating optical system comprises a plurality of truncated lenses.

4. A laser light multiplexing apparatus according to claim 3, further comprising:

additional semiconductor lasers which emit additional light beams; and a polarization multiplex means which performs polarization multiplexing of said additional light beams and said light beams in optical paths of the light beams between said plurality of semiconductor lasers and said optical fiber so that said additional light beams also enter said optical fiber.

5. A laser light multiplexing apparatus according to claim 3, further comprising:

additional semiconductor lasers which emit additional light beams; and a wavelength multiplex means which performs wavelength multiplexing of said additional light beams and said light beams in optical paths of the light beams between said plurality of semiconductor lasers and said optical fiber so that said additional light beams also enter said optical fiber.

6. A laser light multiplexing apparatus according to claim 2, further comprising:

additional semiconductor lasers which emit additional light beams; and a polarization multiplex means which performs polarization multiplexing of said additional light beams and said light beams in optical paths of the light beams between said plurality of semiconductor lasers and said optical fiber so that said additional light beams also enter said optical fiber.

7. A laser light multiplexing apparatus according to claim 2, further comprising:

additional semiconductor lasers which emit additional light beams; and a wavelength multiplex means which performs wavelength multiplexing of said additional light beams and said light beams in optical paths of the light beams between said plurality of semiconductor lasers and said optical fiber so that said additional light beams also enter said optical fiber.

* * * * *